United States Patent
Kim et al.

(10) Patent No.: US 12,530,747 B2
(45) Date of Patent: Jan. 20, 2026

(54) IMAGE PROCESSING APPARATUS AND METHOD FOR PROCESSING IMAGE THEREBY

(71) Applicant: SAMSUNG ELECTRONICS CO., LTD., Suwon-si (KR)

(72) Inventors: Sanghun Kim, Suwon-si (KR); Moonhee Kim, Suwon-si (KR); Bongjoe Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 395 days.

(21) Appl. No.: 17/982,188

(22) Filed: Nov. 7, 2022

(65) Prior Publication Data

US 2023/0126778 A1    Apr. 27, 2023

Related U.S. Application Data

(63) Continuation of application No. PCT/KR2022/016472, filed on Oct. 26, 2022.

(30) Foreign Application Priority Data

Oct. 27, 2021    (KR) .................. 10-2021-0144970

(51) Int. Cl.
  *G06T 5/70*    (2024.01)
  *G06T 5/50*    (2006.01)
(52) U.S. Cl.
  CPC .............. *G06T 5/70* (2024.01); *G06T 5/50* (2013.01); *G06T 2207/20024* (2013.01); *G06T 2207/20084* (2013.01)
(58) Field of Classification Search
  None
  See application file for complete search history.

(56) References Cited

U.S. PATENT DOCUMENTS

| | | |
|---|---|---|
| 9,264,705 B2 | 2/2016 | Lee et al. |
| 10,552,944 B2 | 2/2020 | Wang |

(Continued)

FOREIGN PATENT DOCUMENTS

| | | |
|---|---|---|
| EP | 3 518 178 A1 | 7/2019 |
| JP | 2004-362465 A | 12/2004 |

(Continued)

OTHER PUBLICATIONS

Zhang et al., "Beyond a Gaussian Denoiser: Residual Learning of Deep CNN for Image Denoising," IEEE Transactions on Image Processing, vol. 26, No. 7, pp. 3142-3155, Jul. 2017.

(Continued)

*Primary Examiner* — SJ Park
*Assistant Examiner* — Caroline E. Depalma
(74) *Attorney, Agent, or Firm* — Sughrue Mion, PLLC

(57) ABSTRACT

Provided is an image processing apparatus including a memory storing at least one instruction; and a processor configured to execute the at least one instruction to: obtain, from a first image, a second image from which noise has been removed using a filtering algorithm; determine first weight data corresponding to the first image and second weight data corresponding to the second image, by applying the first image to a neural network for deriving a mixing ratio between the first image and the second image; and obtain an output image by mixing a first result obtained by applying the first weight data to the first image, with a second result obtained by applying the second weight data to the second image.

20 Claims, 17 Drawing Sheets

(56) References Cited

U.S. PATENT DOCUMENTS

| | | | |
|---|---|---|---|
| 10,853,921 B2 | 12/2020 | Park et al. | |
| 11,200,642 B2 | 12/2021 | Hwang et al. | |
| 2013/0156345 A1 | 6/2013 | Shmunk | |
| 2019/0266709 A1* | 8/2019 | Takeda | G06T 5/50 |
| 2020/0241096 A1 | 7/2020 | Bustin et al. | |
| 2020/0241098 A1* | 7/2020 | Shinoda | G01R 33/5608 |
| 2020/0265567 A1 | 8/2020 | Hu et al. | |
| 2020/0372612 A1 | 11/2020 | Higaki | |
| 2021/0097662 A1* | 4/2021 | Wang | G06T 5/50 |
| 2022/0076375 A1 | 3/2022 | Lee et al. | |
| 2022/0130021 A1 | 4/2022 | Mao et al. | |
| 2023/0020328 A1* | 1/2023 | Tanaka | G06T 5/70 |

FOREIGN PATENT DOCUMENTS

| | | |
|---|---|---|
| JP | 2019-8599 A | 1/2019 |
| JP | 2020-140715 A | 9/2020 |
| KR | 10-0243225 B1 | 2/2000 |
| KR | 10-1612165 B1 | 4/2016 |
| KR | 10-2020-0069419 A | 6/2020 |
| KR | 10-2020-0096398 A | 8/2020 |
| KR | 10-2020-0135102 A | 12/2020 |
| KR | 10-2021-0085373 A | 7/2021 |
| WO | 2021/197583 A1 | 10/2021 |

OTHER PUBLICATIONS

Zhang et al., "FFDNet: Toward a Fast and Flexible Solution for CNN based Image Denoising," arXiv:1710.04026v2 [cs.CV], May 22, 2018, Total 15 pages.
International Search Report (PCT/ISA/237) issued Feb. 10, 2023 by the International Searching Authority in International Application No. PCT/KR2022/016472.
Written Opinion (PCT/ISA/237) issued Feb. 10, 2023 by the International Searching Authority in International Application No. PCT/KR2022/016472.
Communication issued Oct. 29, 2024 by the European Patent Office in European Patent Application No. 22887604.1.
Communication issued Nov. 19, 2025 by the Korean Intellectual Property Office in Korean Patent Application No. 10-2021-0144970.

* cited by examiner

IMAGE PROCESSING APPARATUS AND METHOD FOR PROCESSING IMAGE THEREBY

CROSS-REFERENCE TO RELATED APPLICATION(S)

This application is a bypass continuation of PCT International Application No. PCT/KR2022/016472, which was filed on Oct. 26, 2022, and claims priority to Korean Patent Application No. 10-2021-0144970, filed on Oct. 27, 2021, in the Korean Intellectual Property Office, the disclosures of which are incorporated by reference herein in their entirety.

BACKGROUND

1. Field

The disclosure relates to the field of image processing, and more specifically, efficiently removing noise included in an image.

2. Description of Related Art

Images captured by cameras may include noise generated during a transmission process through a network and an encoding/decoding process. Because the noise included in images adversely affects clear identification of an object, the noise needs to be removed.

The noise included in images may be removed by a rule-based filtering algorithm or an artificial intelligence (AI)-based filtering algorithm.

A rule-based filtering algorithm (or a non-AI-based filtering algorithm) removes the noise included in an image according to a predetermined rule. Although a rule-based filtering algorithm is easy to use, it is difficult to adaptively change a rule according to an image. This makes it difficult to flexibly remove noise. A bilateral filter, which has been used for a long time in the image processing field, removes noise by using a weighted sum between adjacent pixels. At this time, a weight is determined according to an intensity similarity and a distance between a pixel for removing noise and its surrounding pixels. A bidirectional filter is simple and effective, but has the disadvantage of destroying the details contained in an image.

An AI-based filtering algorithm removes the noise included in an image by using a pre-trained neural network. A noise removal method depends on how a neural network is trained, and images may be flexibly processed by increasing the amount of training of the neural network. However, when an AI-based filtering algorithm is implemented as an embedded system, it is necessary to newly train a neural network to improve the neural network, and thus usability may not be good and intuitive control by users is difficult.

Therefore, a new filtering method having both the merits of a rule-based filtering algorithm and the merits of an AI-based filtering algorithm is required.

SUMMARY

Provided are an image processing apparatus and an image processing method in which the noise within an image is effectively removed using both a rule-based algorithm and an AI-based algorithm.

Further, provided are the image processing apparatus and the image processing method in which, even when an AI-based algorithm is used, intuitive control by users is possible.

Further still, provided are the image processing apparatus and the image processing method in which filter use is minimized through a new definition of loss information for training a neural network, or, when various filters are used, priority according to the filters is given.

According to an aspect of the disclosure, an image processing apparatus may include a memory storing at least one instruction; and a processor configured to execute the at least one instruction to: obtain, from a first image, a second image from which noise has been removed using a first filtering algorithm, determine first weight data corresponding to the first image and second weight data corresponding to the second image by applying the first image to a neural network for deriving a mixing ratio between the first image and the second image, and obtain an output image by mixing a first result obtained by applying the first weight data to the first image with a second result obtained by applying the second weight data to the second image.

The filtering algorithm may be based on a non-neural network.

The processor may be further configured to execute the at least one instruction to: obtain the first weight data from the neural network, and determine the second weight data, based on a difference between a pre-determined value and sample values of the first weight data.

The first weight data for a first training image corresponding to an original training image, and second weight data for a second training image obtained by filtering the first training image, may be obtained by applying the first training image to the neural network, and the neural network may be trained based on first loss information corresponding to a difference between an output image obtained by mixing the first training image with the second training image and the original training image, and second loss information corresponding to a sum of sample values of the second weight data for the second training image.

The processor may be further configured to execute the at least one instruction to: obtain, from the first image, a third image from which noise has been removed using a second filtering algorithm; determine third weight data corresponding to the third image by applying the first image to the neural network; and obtain the output image by mixing the first result, the second result, and a third result obtained by applying the third weight data to the third image.

A type of the first filtering algorithm used to obtain the second image may be different from a type of the second filtering algorithm used to obtain the third image.

The first weight data for a first training image corresponding to an original training image, second weight data for a second training image obtained by filtering the first training image, and third weight data for a third training image obtained by filtering the first training image may be obtained by applying the first training image to the neural network, and the neural network may be trained based on final loss information obtained through a weighted sum of first loss information, second loss information, and third loss information. The first loss information may correspond to a difference between an output image obtained by mixing the first training image, the second training image, and the third training image, and the original training image, the second loss information may correspond to a sum of sample values of the second weight data for the second training image, and the third loss information may correspond to a sum of sample values of the third weight data for the third training image.

To obtain the final loss information, a weight applied to the second loss information may be less than a weight applied to the third loss information.

A filtering strength of the first filtering algorithm used to obtain the second training image may be smaller than a filtering strength of a second filtering algorithm used to obtain the third training image.

The processor may be further configured to execute the at least one instruction to: change a first sample value included in one weight data among the first weight data and the second weight data, according to an input from a user, change a second sample value included in another weight data according to a degree of change in the first sample value included in the one weight data, and obtain the output image by mixing a result obtained by applying the first weight data including the changed first sample value to the first image, with a result obtained by applying the another weight data including the changed second sample value to the second image.

The processor may be further configured to execute the at least one instruction to: decrease the second sample value included in the another weight data when the first sample value included in the one weight data is increased according to the input from the user; and increase the second sample value included in the another weight data when the first sample value included in the one weight data is decreased according to the input from the user.

The processor may be further configured to execute the at least one instruction to: change the second sample value included in the another weight data as the first sample value included in the one weight data is changed, so that a sum of the first sample value and the second sample value is equal to a pre-determined value.

The processor may be further configured to execute the at least one instruction to: identify a region selected by the user from the first image or the output image; and change sample values included in a region corresponding to the identified region among samples included in the one weight data.

The processor may be further configured to execute the at least one instruction to: identify a region selected by the user, through object recognition with respect to the first image or the output image.

The processor may be further configured to execute the at least one instruction to: obtain the output image through a summation between the first result obtained through multiplication between samples of the first image and samples of the first weight data, and the second result obtained through multiplication between samples of the second image and samples of the second weight data.

According to an aspect of the disclosure, an image processing method includes: obtaining, from a first image, a second image from which noise has been removed using a first filtering algorithm; determining first weight data corresponding to the first image and second weight data corresponding to the second image, by applying the first image to a neural network for outputting a mixing ratio between the first image and the second image; and obtaining an output image by mixing a first result obtained by applying the first weight data to the first image, with a second result obtained by applying the second weight data to the second image.

The method may further include: obtaining first weight data for a first training image corresponding to an original training image, and second weight data for a second training image obtained by filtering the first training image, by applying the first training image to the neural network; and training the neural network based on first loss information corresponding to a difference between an output image obtained by mixing the first training image with the second training image and the original training image, and second loss information corresponding to a sum of sample values of the second weight data for the second training image.

The method may further include: obtaining, from the first image, a third image from which noise has been removed using a second filtering algorithm; determining third weight data corresponding to the third image by applying the first image to the neural network for deriving a mixing ratio between the first image, the second image, and the third image; and obtaining the output image by mixing the first result, the second result, and a third result obtained by applying the third weight data to the third image.

According to an aspect of the disclosure, a non-transitory computer-readable recording medium may have recorded thereon a computer program, which, when executed by a computer, performs an image processing method including: obtaining, from a first image, a second image from which noise has been removed using a first filtering algorithm; determining first weight data corresponding to the first image and second weight data corresponding to the second image, by applying the first image to a neural network for outputting a mixing ratio between the first image and the second image; and obtaining an output image by mixing a first result obtained by applying the first weight data to the first image, with a second result obtained by applying the second weight data to the second image.

The image processing method may further include: obtaining first weight data for a first training image corresponding to an original training image, and second weight data for a second training image obtained by filtering the first training image, by applying the first training image to the neural network; and training the neural network based on first loss information corresponding to a difference between an output image obtained by mixing the first training image with the second training image and the original training image, and second loss information corresponding to a sum of sample values of the second weight data for the second training image.

In an image processing apparatus and an image processing method according to an embodiment, the noise within an image is effectively removed using both a rule-based algorithm and an AI-based algorithm.

In addition, in the image processing apparatus and the image processing method according to an embodiment, even when an AI-based algorithm is used, intuitive control by users is possible.

Moreover, in the image processing apparatus and the image processing method according to an embodiment, filter use is minimized through a new definition of loss information for training a neural network, or, when various filters are used, priority according to the filters is given.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
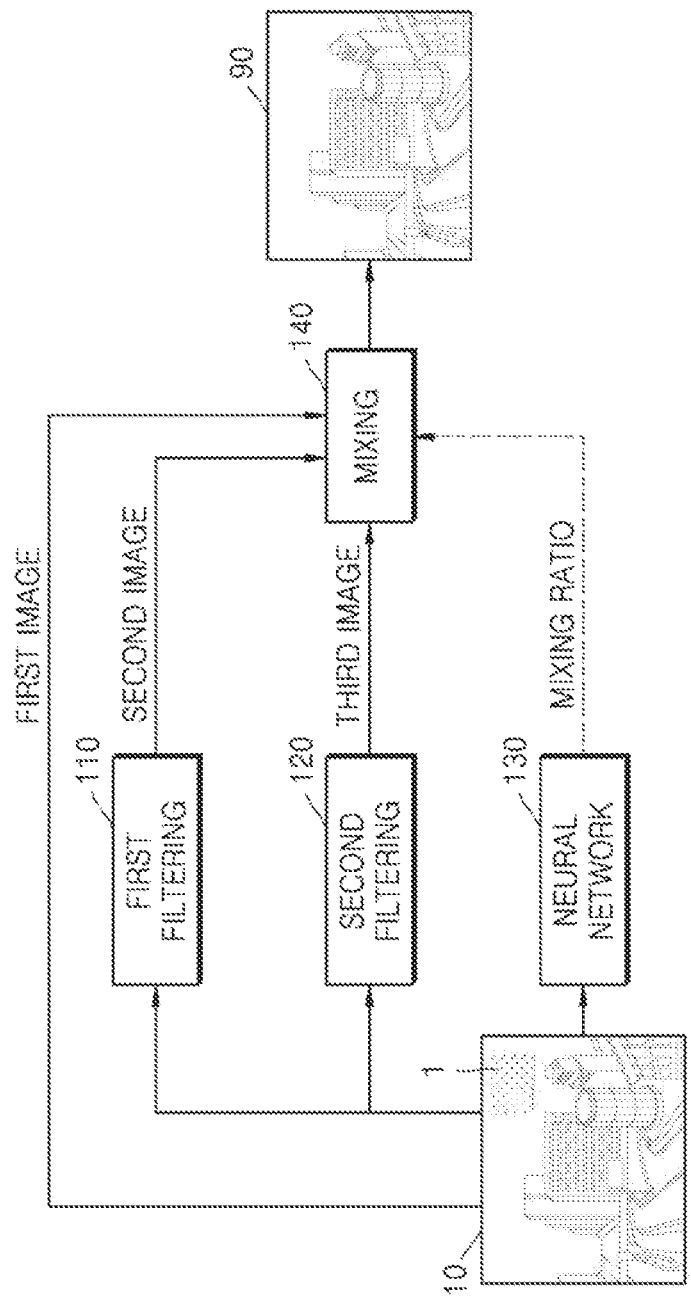
FIG. 1 is a diagram for explaining a noise removal process with respect to a first image, according to an embodiment of the disclosure.

Throughout the disclosure, the expression "at least one of a, b or c" indicates only a, only b, only c, both a and b, both a and c, both b and c, or all of a, b, and c.

As the disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

In the description of embodiments of the disclosure, certain detailed explanations of the related art are omitted when it is deemed that they may unnecessarily obscure the essence of the disclosure. While such terms as "first," "second," etc., may be used to describe various components, such components must not be limited to the above terms. The above terms are used only to distinguish one component from another.

When an element (e.g., a first element) is "coupled to" or "connected to" another element (e.g., a second element), the first element may be directly coupled to or connected to the second element, or, unless otherwise described, a third element may exist therebetween.

Regarding a component represented as a "portion (unit)" or a "module" used herein, two or more components may be combined into one component or one component may be divided into two or more components according to subdivided functions. In addition, each component described hereinafter may additionally perform some or all of functions performed by another component, in addition to main functions of itself, and some of the main functions of each component may be performed entirely by another component.

An 'image' may indicate a still image, a moving picture composed of a plurality of continuous still images (or frames), or a video.

A 'neural network' is a representative example of an artificial neural network model simulating a brain nerve, and is not limited to an artificial neural network model using a specific algorithm. The neural network may also be referred to as a deep neural network.

A 'parameter', which is a value used in a computation process of each layer constituting a neural network, may be used, for example, when an input value is applied to a predetermined computation formula. The parameter, which is a value set as a result of training, may be updated through separate training data according to need.

A 'first image' refers to an image from which noise is to be removed, and a 'second image' and a 'third image' refer to images from which noise has been removed through filtering with respect to the first image. An 'output image' refers to an image obtained through a noise removal process for the first image.

A 'sample', which is data assigned to a sampling location such as an image, a feature map, or weight data, refers to data that is to be processed. For example, the 'sample' may be a pixel value in a frame in a spatial domain.

FIG. 1 is a diagram for explaining a noise removal process with respect to a first image 10, according to an embodiment of the disclosure.

The first image 10 may include noise 1 due to transmission/reception through a network after being captured by a camera or due to encoding/decoding. When only a rule-based filter or an AI-based filter is used to remove the noise 1 of the first image 10, it may be difficult to simultaneously achieve two purposes, namely, detail preservation and noise removal.

In embodiments of the disclosure, a rule-based filter and an AI-based algorithm are used together to preserve the details of the first image 10 and remove noise from the first image 10. The rule-based filter may be referred to as a non-neural network-based filter or a non-AI-based filter. The non-neural network-based filter may refer to a filter that does not use a neural network.

As shown in FIG. 1, a second image is obtained by removing noise from the first image 10 via first filtering 110 with respect to the first image 10, and a third image is obtained by removing noise from the first image 10 via second filtering 120 with respect to the first image 10.

A rule-based filtering algorithm may be used in the first filtering 110 and the second filtering 120. Examples of the rule-based filtering algorithm may include a Gaussian filtering algorithm, a median filtering algorithm, and a bilateral filtering algorithm.

The type of an algorithm used in the first filtering 110 may be different from that of an algorithm used in the second filtering 120. When the same type of algorithms are used in the first filtering 110 and the second filtering 120, the degree of the first filtering 110 may be different from the degree of the second filtering 120.

The reason for setting different types of filtering algorithms or different filtering strengths for the first filtering 110 and the second filtering 120 is to prevent the second image and the third image from becoming the same. As will be described later, the first image 10, the second image, and the third image, which are different from one another, may be adaptively mixed (as indicated by reference numeral 140), and thus the details of the first image 10 may be preserved and an output image 90 resulting from removing noise from the first image 10 may still be obtained.

Separately from the first image 10 undergoing the first filtering 110 and the second filtering 120, the first image 10 is input to a neural network 130. The neural network 130 processes the first image 10 according to a parameter set according to training. A mixing ratio between the first image 10, the second image, and the third image is obtained as a result of processing of the first image 10 by the neural network 130.

The mixing ratio includes information about the noise included in the first image 10. For example, the mixing ratio may include information about what sample the first image 10 is noise. As will be described later, the mixing ratio may include weight data that are to be applied to each image to be mixed. The value of each sample in the weight data may represent whether a corresponding sample in the first image 10 corresponds to noise.

For example, when a specific sample value within weight data to be applied to the first image 10 is greater than a pre-determined value, a corresponding sample within the first image 10 may be identified as being not noise. On the other hand, when a specific sample value within the weight data to be applied to the first image 10 is less than or equal to the pre-determined value, the corresponding sample within the first image 10 may be identified as noise.

In the disclosure, by defining new loss information that is to be used for training the neural network 130, each sample value of the weight data may indicate whether the samples of the first image 10 correspond to noise. A process of training the neural network 130 will be described later with reference to FIG. 15.

The first image 10, the second image, and the third image may be mixed (as indicated by reference numeral 140) based on the mixing ratio. The output image 90 is obtained as a result of the mixing 140 of the first image 10, the second image, and the third image. When the samples of the first image 10, the samples of the second image, and the samples of the third image are mixed (140), the mixing ratio may indicate the images of which samples are to be mixed, and the ratio at which samples are to be mixed.

For example, when a specific sample within the first image 10 is noise, the mixing ratio of the corresponding samples of the second image or the third image may be increased so that a sample created as a result of the first filtering 110 or the second filtering 120 has a major influence on the output image 90. Thus, the noise 1 within the first image 10 may be removed from the output image 90.

On the other hand, when the specific sample within the first image 10 is not noise, the mixing ratio of the corresponding samples of the first image 10 may be increased so that a not-filtered sample has a major influence on the output image 90. Thus, the details of the first image 10 may be maintained even in the output image 90.

In the disclosure, a rule-based filtering algorithm is used in filtering of the first image 10, and a mixing ratio of images obtained by filtering the first image 10 (i.e., the second image and the third image) and the first image 10 is obtained based on AI, and thus all of the merits of the rule-based algorithm and the AI-based algorithm may be employed.

Although the second image and the third image are obtained through the first filtering 110 and the second filtering 120 with respect to the first image 10 in FIG. 1, the number of filtered images may be one, or may be more than 2. When the number of filtered images may be one, the first image 10 and the second image may be mixed (140) according to the mixing ratio. When the number of filtered images may be three, the first image 10, the second image, the third image, and a fourth image may be mixed according to the mixing ratio.

An image processing apparatus 200 according to an embodiment of the disclosure will now be described with reference to FIGS. 2 and 3.

Figure 2:
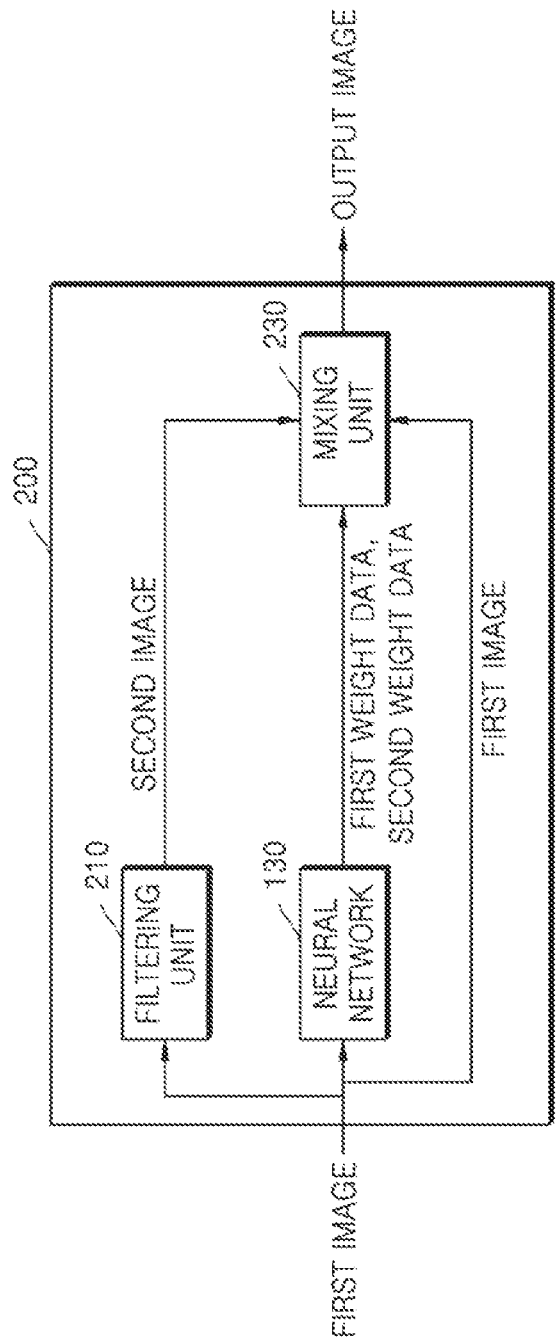
FIG. 2 is a block diagram of a structure of an image processing apparatus according to an embodiment of the disclosure.

FIG. 2 is a block diagram of a structure of the image processing apparatus 200 according to an embodiment of the disclosure.

Referring to FIG. 2, the image processing apparatus 200 may include a filtering unit 210, a mixing unit 230, and the neural network 130.

The filtering unit 210 and the mixing unit 230 may be implemented as at least one processor. The filtering unit 210 and the mixing unit 230 may operate according to one or more instructions stored in a memory.

The neural network 130 may be stored in the memory. According to an embodiment, the neural network 130 may be implemented as a dedicated processor for AI.

The image processing apparatus 200 obtains the first image 10. The image processing apparatus 200 may obtain the first image 10 received from an external apparatus via a network, or may obtain the first image 10 stored in the memory.

The first image 10 is applied to the neural network 130, and thus the first weight data and the second weight data are obtained. As described above, the neural network 130 may process the first image 10 according to a parameter set according to a result of training.

As will be described later in detail with reference to FIG. 4, the neural network 130 may include at least one convolution layer that performs a convolution operation on the first image 10. The neural network 130 including at least one convolution layer may output two-dimensional (2D) first weight data and 2D second weight data as a result of the convolution operation on the first image 10.

According to an embodiment, the neural network 130 may include a fully connected layer (FCL) that receives the sample values of the first image 10 as one-dimensional (1D) data and outputs 1D first weight data and 1D second weight data.

Separately from the first image 10 being input to the neural network 130, the first image 10 is input to the filtering unit 210. The filtering unit 210 obtains the second image by filtering the first image 10.

The number of images output by the filtering unit 210 may be one or more, but FIG. 2 illustrates obtainment of one image, namely, the second image, by the filtering unit 210.

The filtering unit 210 obtains the second image by removing noise from the first image 10 by using a filtering algorithm.

The filtering algorithm used to obtain the second image may be a rule-based filtering algorithm. According to an embodiment, an AI-based filtering algorithm may be used to obtain the second image.

When the second image and the third image are obtained by the filtering unit 210, the type of the first filtering algorithm used to obtain the second image may be different from the type of the second filtering algorithm used to obtain the third image. For example, the first filtering algorithm may be a Gaussian filtering algorithm, and the second filtering algorithm may be a bidirectional filtering algorithm.

According to an embodiment, a filtering strength of the first filtering algorithm may be different from a filtering strength of the second filtering algorithm.

The filtering strength may be measured and controlled according to various methods. For example, the filtering strength may be set by controlling the size of a window that is applied to a sample to be filtered and its neighboring samples. In detail, when the size of a window used in the first filtering algorithm is greater than the size of a window used in the second filtering algorithm, it may be considered that the filtering strength of the first filtering algorithm is greater than the filtering strength of the second filtering algorithm.

As another example, the filtering strength may be controlled by applying a simple average or a weighted average to a sample to be filtered and its neighboring samples. In detail, when the simple average is used in the first filtering algorithm and the weighted average is used in the second filtering algorithm, it may be considered that the filtering strength of the first filtering algorithm is greater than the filtering strength of the second filtering algorithm.

As another example, the filtering strength may be controlled according to a variation in a weight curve that is applied to a weighted average for a sample to be filtered and its neighboring samples. In detail, when a weight used in the weighted average of the first filtering algorithm is greater than a weight used in the weighted average of the second filtering algorithm, it may be considered that the filtering strength of the first filtering algorithm is greater than the filtering strength of the second filtering algorithm.

The mixing unit 230 obtains the output image 90 by mixing the first image 10 and the second image according to the first weight data and the second weight data. The output image 90 may be output through a display connected to the image processing apparatus 200, or may be transmitted to an external apparatus through a network.

The mixing unit 230 may apply the first weight data obtained as a result of processing of the first image 10 by the neural network 130 to the first image 10, and may apply the second weight data to the second image. The 'applying' may refer to processing the value of at least one of the samples included in the first image 10, based on the sample values of the first weight data, and processing at least one of the samples included in the second image, based on the sample values of the second weight data.

According to an embodiment, to achieve application of the first weight data and the second weight data, the mixing unit 230 may control the sample values of the first image 10 according to the sample values of the first weight data and control the sample values of the second image according to the sample values of the second weight data.

The mixing unit 230 may mix the first image 10 to which the first weight data has been applied with the second image to which the second weight data has been applied, to thereby obtain the output image 90.

According to an embodiment, the mixing unit 230 may change the sample value of the first weight data and/or the second weight data according to a user input. When the sample value of the first weight data and/or the second weight data is changed, the mixing unit 230 may mix the first image 10 and the second image by using the changed first weight data and/or the changed second weight data. A process of changing weight data according to a user input will be described later with reference to FIGS. 11 and 12.

According to an embodiment, when the second image and the third image are output by the filtering unit 210, the mixing unit 230 mixes the first image 10, the second image, and the third image to obtain the output image 90.

Figure 3:
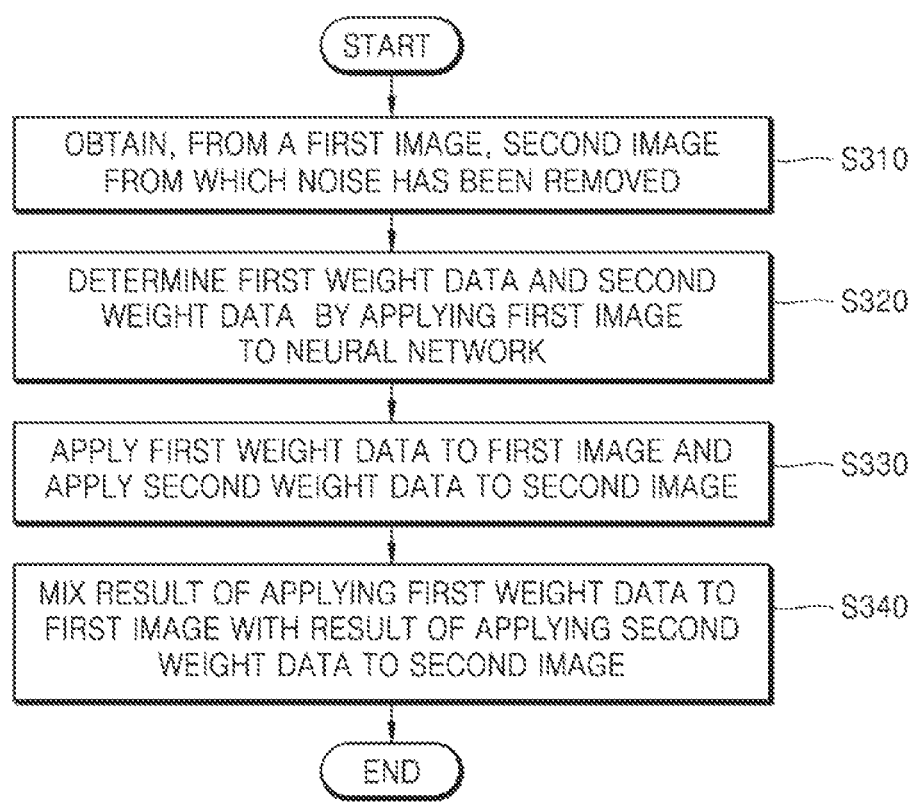
FIG. 3 is a flowchart of an image processing method performed by an image processing apparatus according to an embodiment of the disclosure.

FIG. 3 is a flowchart of an image processing method performed by the image processing apparatus 200, according to an embodiment of the disclosure.

In operation S310, the image processing apparatus 200 obtains the second image by removing noise from the first image 10. The image processing apparatus 200 may apply a filtering algorithm to the first image 10 in order to obtain the second image. The image processing apparatus 200 may further obtain the third image by removing noise from the first image 10.

In operation S320, the image processing apparatus 200 determines the first weight data corresponding to the first image 10 and the second weight data corresponding to the second image by applying the first image 10 to the neural network 130.

According to the sample values of the first weight data and the sample values of the second weight data, the mixing ratio between the first image 10 and the second image may be determined. It may be understood that the sample values of the first weight data indicate a ratio at which the samples of the first image 10 are used to generate the samples of the output images 90, and the sample values of the second weight data indicate a ratio at which the samples of the second image are used to generate the samples of the output images 90. The first weight data and the second weight data may include information about a sample corresponding to noise from among the samples of the first image 10.

The first weight data and the second weight data may be 1D data or 2D data. The 2D weight data may be referred to as a weight map. The 1D weight data includes samples arranged in one direction, and the 2D weight data includes samples arranged in a height direction and a width direction.

The number of samples included in the first weight data and the second weight data may be equal to the number of samples included in the first image 10 and the second image.

According to an embodiment, the samples included in the first weight data and the samples included in the first image 10 may have one-to-one correspondence with each other, and the samples included in the second weight data and the samples included in the second image may have one-to-one correspondence with each other.

The number of weight data obtained by applying the first image 10 to the neural network 130 is equal to the number of images that are to be mixed. For example, when mixing of the first image 10 and the second image is needed, the image processing apparatus 200 determines the first weight data, which is to be applied to the first image 10, and the second weight data, which is to be applied to the second image. As another example, when mixing of the first image 10, the second image, and the third image is needed, the image processing apparatus 200 may determine the first weight data, which is to be applied to the first image 10, the second weight data, which is to be applied to the second image, and third weight data, which is to be applied to the third image.

In operation S330, the image processing apparatus 200 applies the first weight data to the first image 10 and applies the second weight data to the second image.

The image processing apparatus 200 may obtain a weight-applied first image by applying the samples of the first weight data to the samples of the first image 10, and may obtain a weight-applied second image by applying the samples of the second weight data to the samples of the second image.

According to an embodiment, the weight-applied first image may be obtained by multiplying the sample values of the first weight data by the sample values of the first image 10, and the weight-applied second image may be obtained by multiplying the sample values of the second weight data by the sample values of the second image.

In operation S340, the image processing apparatus 200 obtains the output image 90 by mixing the first image 10 to which the first weight data has been applied with the second image to which the second weight data has been applied.

According to an embodiment, the image processing apparatus 200 may obtain the output image 90 by adding the sample values of the weight-applied first image to the sample values of the weight-applied second image.

Because the first weight data and the second weight data indicate the mixing ratio between the first image 10 and the second image, the sample values of the weight-applied first image and the sample values of the weight-applied second image may be summed, and thus the first image 10 and the second image may be mixed according to the mixing ratio.

Before a method of mixing the first image 10 with the second image is described in detail, the neural network 130 processing the first image 10 will be described below.

Figure 4:
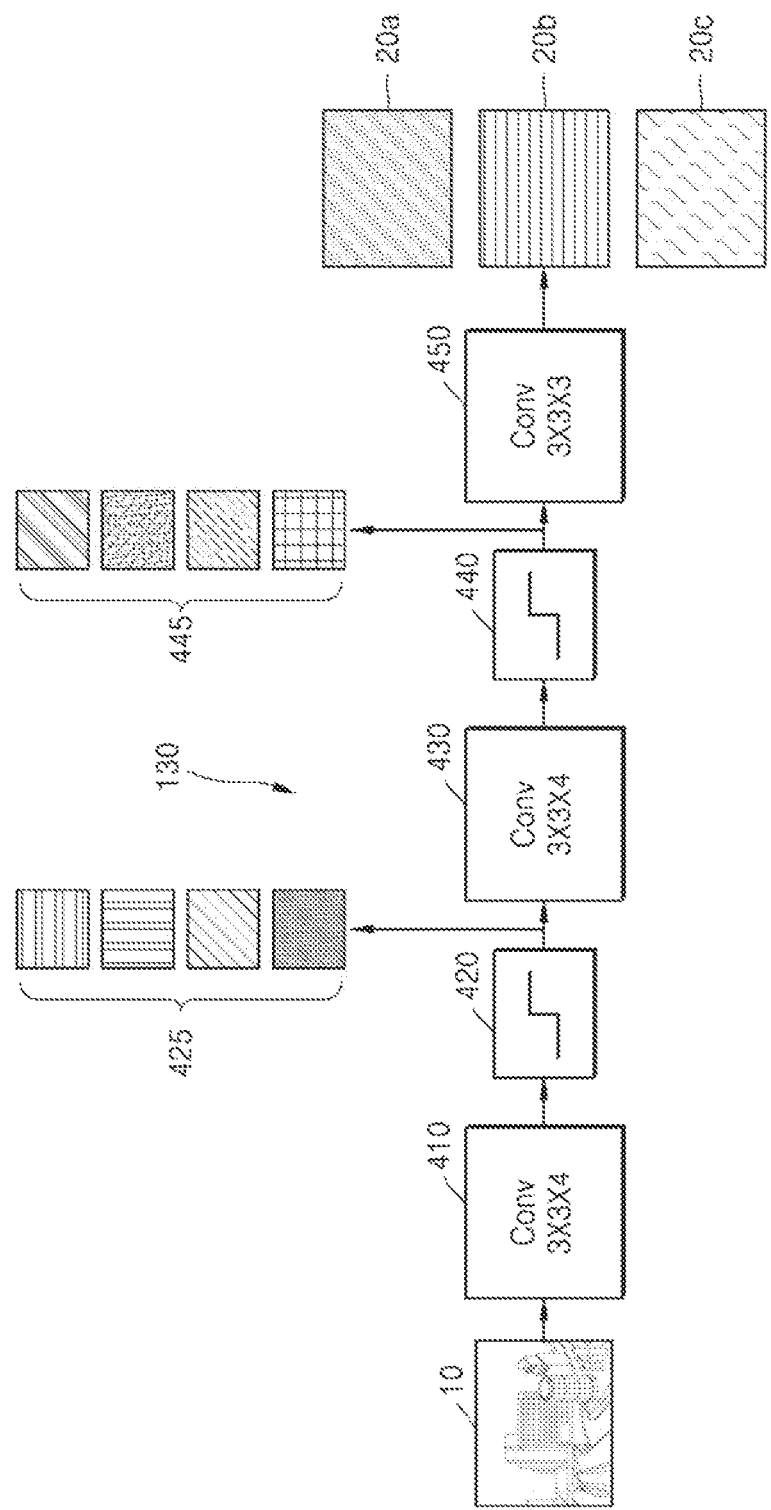
FIG. 4 is a diagram illustrating a neural network according to an embodiment of the disclosure.
Figure 5:
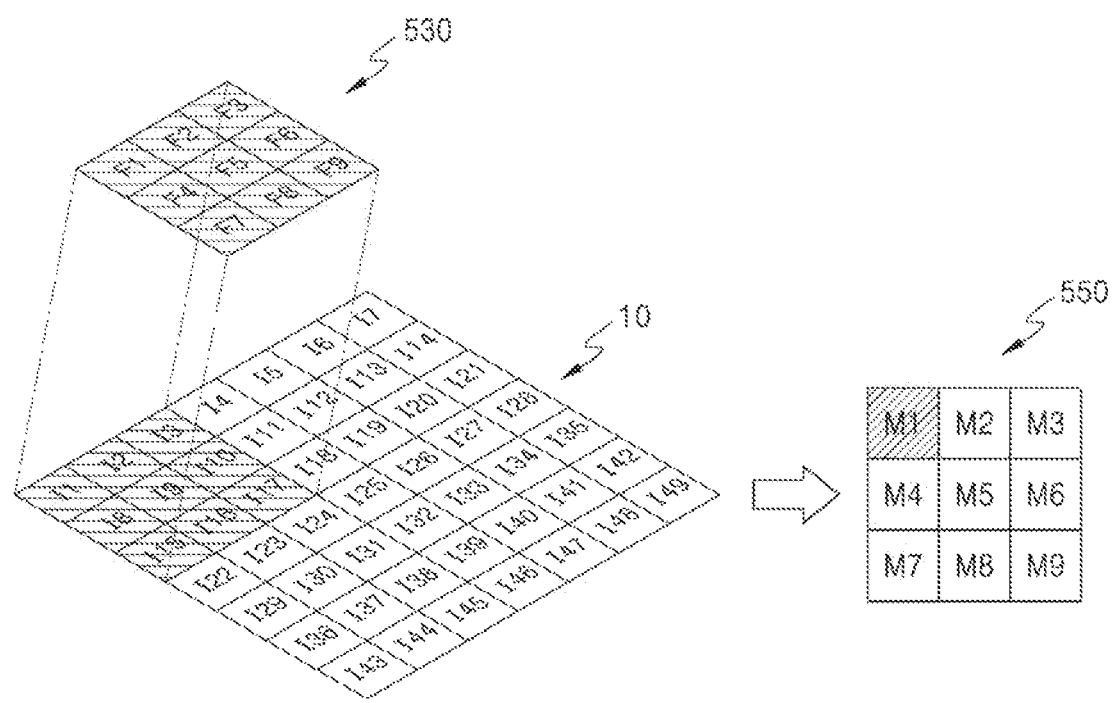
FIG. 5 is a view for explaining a convolution operation in a convolution layer.

FIG. 4 is a diagram illustrating the neural network 130 according to an embodiment of the disclosure, and FIG. 5 is a view for explaining a convolution operation in a convolution layer.

As shown in FIG. 4, the first image 10 is input to a first convolution layer 410. 3×3×4 displayed on the first convolution layer 410 of FIG. 4 illustrates that convolution is performed on one image by using four filter kernels each having a 3×3 size. Four feature maps are generated by the four filter kernels as a result of the convention operation. Each feature map represents unique characteristics of the first image 10. For example, each feature map may represent the vertical direction characteristics, the horizontal direction characteristics, or the edge characteristics of the first image 10.

A convolution operation in the first convolution layer 410 will be described below in detail with reference to FIG. 5.

A single feature map 550 may be generated through a multiplication operation and an addition operation between parameters of a filter kernel 530 having a size of 3×3 used in the first convolution layer 410 and sample values in the first image 10 corresponding to the parameters. Because the four filter kernels are used in the first convolution layer 410, the four feature maps may be generated through a convolution operation process using the four filter kernels.

In FIG. 5, I1 through I49 displayed on the first image 10 represent the samples of the first image 10, and F1 through F9 displayed on the filter kernel 530 represent the samples (which may be referred to as parameters) of the filter kernel 530. M1 through M9 displayed on the feature map 550 represent the samples of the feature map 550.

FIG. 5 illustrates inclusion of 49 samples in the first image 10, but this is merely an example. When the first image 10 has a resolution of 4K, the first image 10 may include 3840×2160 samples, for example.

In a convolution operation process, a multiplication operation between each of the sample values of I1, I2, I3, I8, I9, I10, I15, I16, and I17 of the first image 10 and each of F1, F2, F3, F4, F5, F6, F7, F8 and F9 of the filter kernel 530 may be performed, and a value of a combination of result values of the multiplication operations (for example, an addition operation) may be allocated as the value of M1 of the feature map 550. When the stride of a convolution operation is 2, a multiplication operation between each of the sample samples of I3, I4, I5, I10, I11, I12, I17, I18, and I19 of the first image 10 and each of F1, F2, F3, F4, F5, F6, F7, F8 and F9 of the filter kernel 530 may be performed, and a value of a combination of result values of the multiplication operations may be allocated as the value of M2 of the feature map 550.

While the filter kernel 530 is moving according to the stride until reaching the last sample of the first image 10, a convolution operation between the sample values within the first image 10 and the samples of the filter kernel 530 may be performed, and thus the feature map 550 having a certain size may be obtained.

According to the disclosure, the parameters of the neural network 130, for example, the values of the parameters of the neural network 130, for example, the samples of a filter kernel used in the convolution layers of the neural network 130 (e.g., F1, F2, F3, F4, F5, F6, F7, F8 and F9 of the filter kernel 530), may be optimized through training of the neural network 130.

The convolution layers included in the neural network 130 may be processed according to the convolution operation process described above with reference to FIG. 5, but the convolution operation process described above with reference to FIG. 5 is only an example. Embodiments are not limited thereto.

Referring back to FIG. 4, feature maps output by the first convolution layer 410 are input to a first activation layer 420.

The first activation layer 420 may give non-linear features to each of the feature maps. The first activation layer 420 may include, but is not limited to, a sigmoid function, a Tanh function, a Rectified Linear Unit (ReLU) function, and the like.

The first activation layer 420 imparting non-linear characteristics refers to changing and outputting some sample values of the feature maps output by the first convolution layer 410. This change is performed using the non-linear characteristics.

The first activation layer 420 determines whether to transmit the sample values of the feature maps output by the first convolution layer 410 to a second convolution layer 430. For example, some of the sample values of the feature maps are activated by the first activation layer 420 and transmitted to the second convolution layer 430, and some sample values are not activated by the first activation layer 420 and not transmitted to the second convolution layer 430. Unique characteristics of the first image 10 that are indicated by the feature maps are emphasized by the first activation layer 420.

Feature maps 425 output by the first activation layer 420 are input to a second activation layer 430. On of the feature maps 425 of FIG. 4 is a result obtained by processing the feature map 550 described above with reference to FIG. 5 in the first activation layer 420.

3×3×4 displayed on the second convolution layer 430 illustrates that convolution is performed on the input feature maps 425 by using four filter kernels each having a 3×3 size. An output of the second convolution layer 430 is input to a second activation layer 440. The second activation layer 440 may give non-linear features to input data.

Feature maps 445 output by the second activation layer 440 are input to a third activation layer 450. 3×3×4 displayed on the third convolution layer 450 of FIG. 4 illustrates that convolution is performed to create three weight data 20a, 20b, and 20c by using three filter kernels each having a 3×3 size. According to an embodiment of the disclosure, the third convolution layer 450 may output the three weight data 20a, 20b, and 20c through a convolution operation.

FIG. 4 illustrates outputting of the three weight data 20a, 20b, and 20c by the third convolution layer 450. However, the number of weight data output by the third convolution layer 450 may vary. The number of weight data output by the third convolution layer 450 may depend on the number of filter kernels used in the third convolution layer 450. According to an embodiment, the number of weight data output by the third convolution layer 450 may be equal to the number of images that are to be mixed.

FIG. 4 illustrates the neural network 130 including the three first, second, and third convolution layers 410, 430, and 450 and the two first and second activation layers 420 and 440, but this is merely an example. In some case, the number of convolution layers and the number of activation layers may vary. In some cases, the neural network 130 may be implemented as a recurrent neural network (RNN). This case may refer to changing a CNN structure of the neural network 130 according to an embodiment of the disclosure to an RNN structure.

According to an embodiment, the image processing apparatus 200 may include at least one arithmetic logic unit (ALU) for the above-described convolution operation and an operation of an activation layer. The ALU may be implemented as a processor. For the convolution operation, the ALU may include a multiplier that performs a multiplication operation between the sample values of the first image 10 or the feature map output by a previous layer and the sample values of a filter kernel, and an adder that adds the result values of the multiplication. In addition, for the operation of an activation layer, the ALU may include a multiplier that multiplies an input sample value by a weight used in a pre-determined sigmoid function, Tanh function, or ReLU function, and a comparator that compares a result of the multiplication with a predetermined value to determine whether to transmit an input sample value to the next layer.

A method of mixing a first image, a second image, and a third image will now be described in detail with reference to FIGS. 6 through 8.

Figure 6:
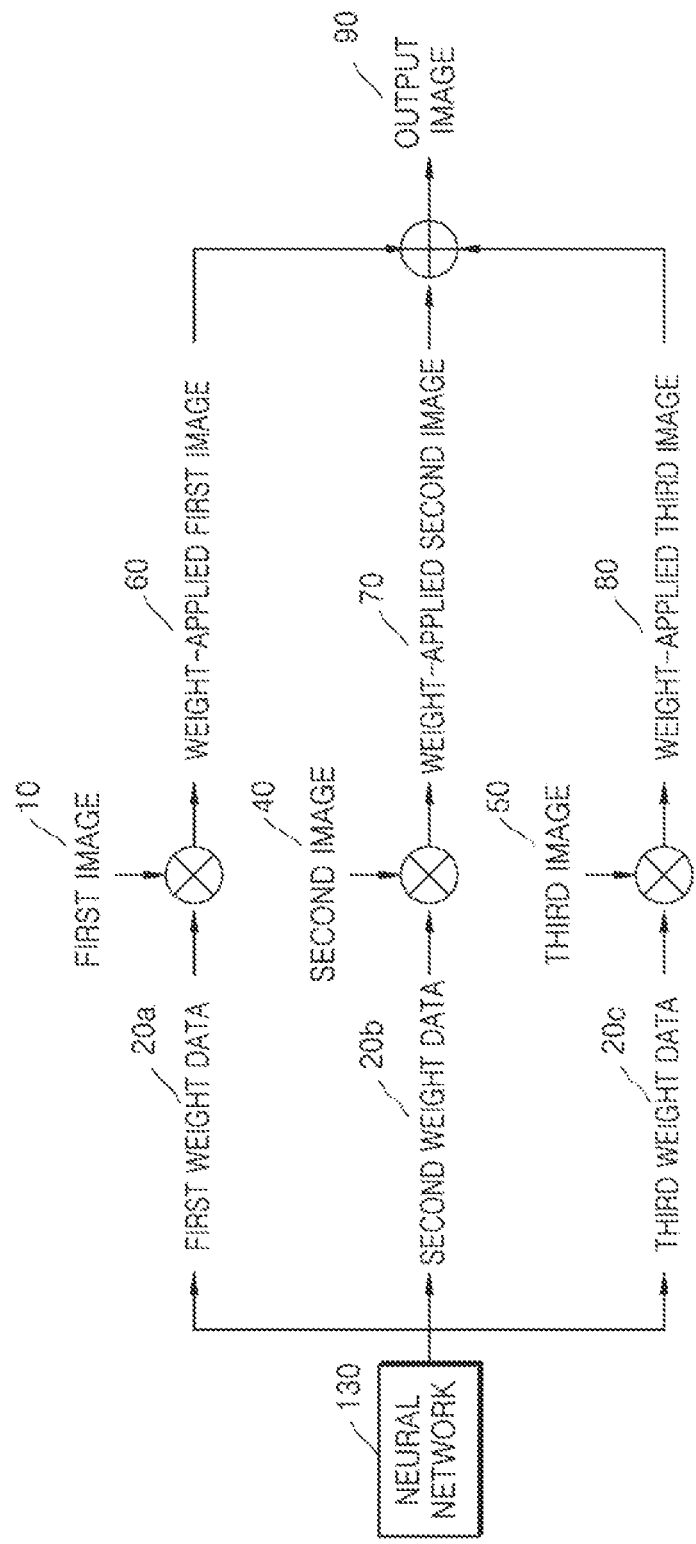
FIG. 6 is a diagram for explaining a method of mixing a first image, a second image, and a third image, based on an output result of the neural network.

FIG. 6 is a diagram for explaining a method of mixing the first image 10, a second image 40, and a third image 50, based on an output result of the neural network 130.

The first weight data 20a, the second weight data 20b, and the third weight data 20c may be obtained as a result of processing of the first image 10 by the neural network 130.

According to an embodiment, the sample values included in the first weight data 20a, the second weight data 20b, and the third weight data 20c may be regularized according to a pre-determined value (for example, 1).

According to an embodiment, the sample values included in the first weight data 20a, the second weight data 20b, and the third weight data 20c correspond to a mixing ratio of the samples of the first image 10, the samples of the second image 40, and the samples of the third image 50, and thus a sum of the sample values included in the first weight data 20a, the second weight data 20b, and the third weight data 20c and positioned at the same location may be equal to the pre-determined value (for example, 1).

The required number of weight data needs to be the same as the number of images to be mixed, but the number of weight data output by the neural network 130 may be less than the required number. In other words, when the number of weight data output by the neural network 130 is k (where k is a natural number) and the required number of weight data is n (where n is a natural number greater than k), n-k weight data need to be created from the k weight data. This will be described in greater detail later with reference to FIGS. 9 and 10.

A weight-applied first image 60 is obtained through a multiplication of the samples of the first weight data 20a and the samples of the first image 10. A weight-applied second image 70 is obtained through a multiplication of the samples of the second weight data 20b and the samples of the second image 40. A weight-applied third image 80 is obtained through a multiplication of the samples of the third weight data 20c and the samples of the third image 50.

The output image 90 is obtained through summation of the weight-applied first image 60, the weight-applied second image 70, and the weight-applied third image 80. The summation may be applied to the samples included in the weight-applied first image 60, the weight-applied second image 70, and the weight-applied third image 80 and positioned at the same location. In other words, a first sample within the output image 90 may be derived through summation of a first sample within the weight-applied first image 60, a first sample within the weight-applied second image 70, and a first sample within the weight-applied third image 80. A second sample within the output image 90 may be derived through summation of a second sample within the weight-applied first image 60, a second sample within the weight-applied second image 70, and a second sample within the weight-applied third image 80.

A method of mixing the first image 10, the second image 40, and the third image 50 will now be described in more detail with reference to FIGS. 7 through 8.

Figure 7:
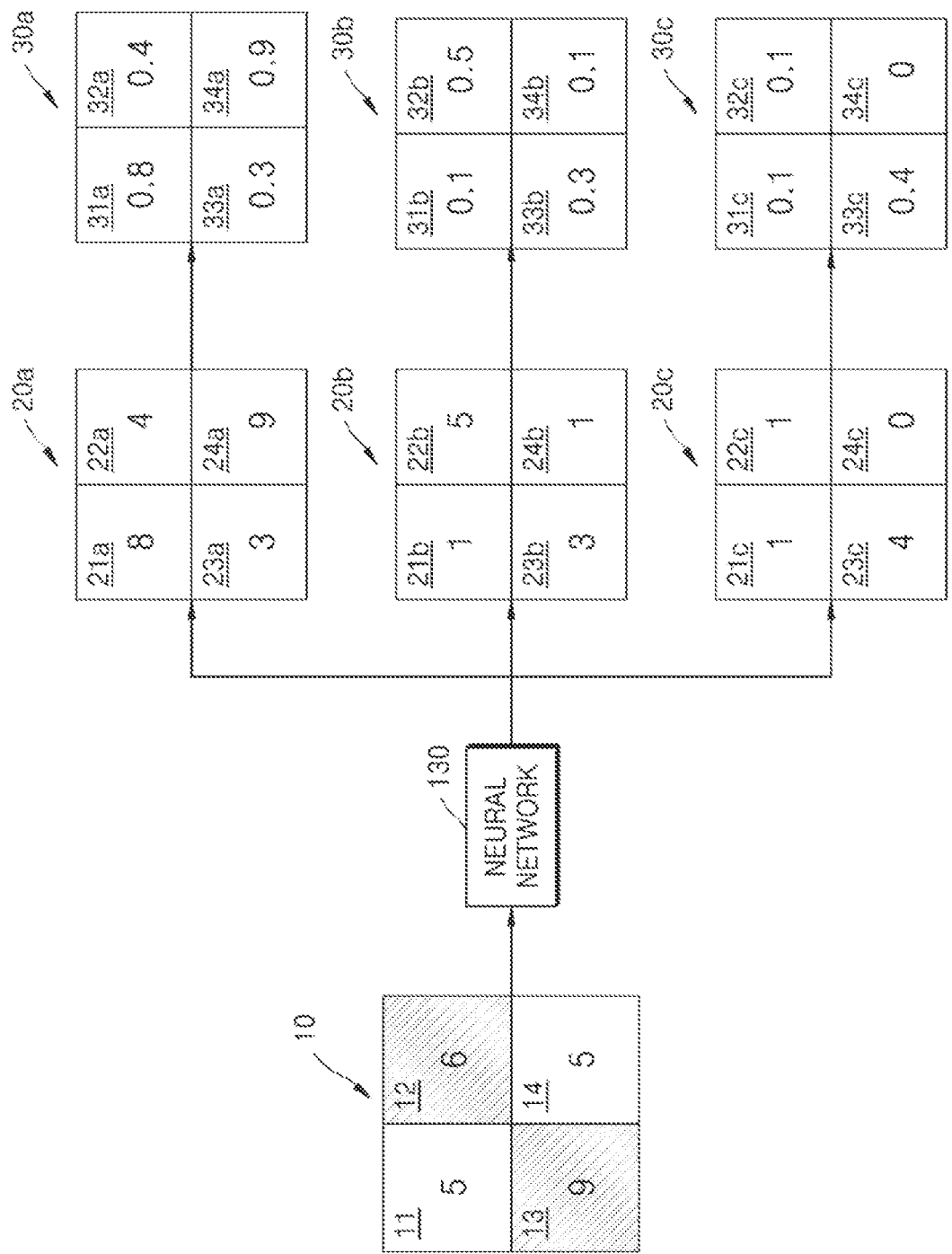
FIG. 7 is a diagram illustrating weight data obtained as a result of processing of a first image by the neural network.
Figure 8:
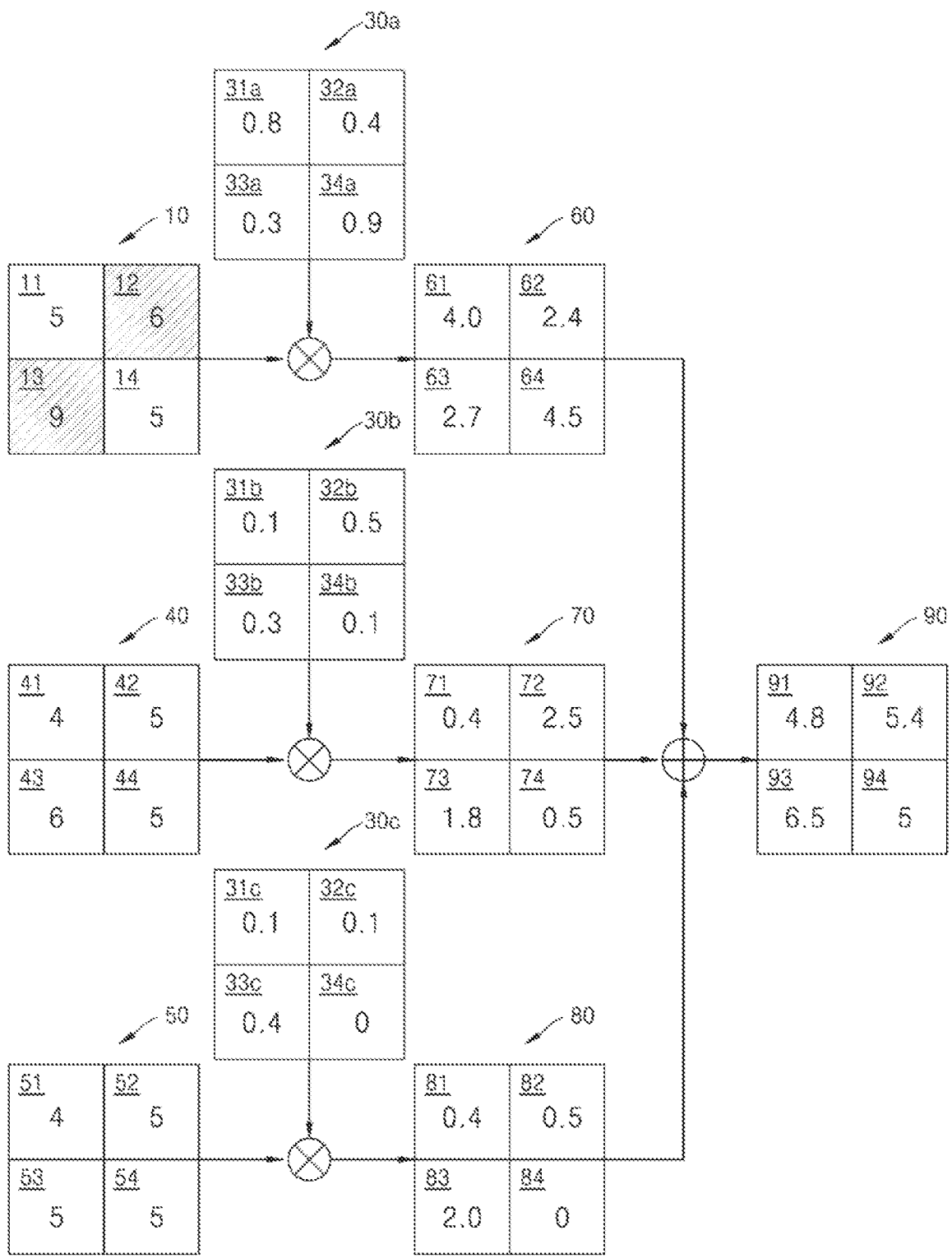
FIG. 8 is a diagram for explaining a method of mixing the first image, the second image, and the third image, based on the weight data of FIG. 7.

FIG. 7 is a diagram illustrating weight data obtained as a result of processing of the first image 10 by the neural network 130, and FIG. 8 is a diagram for explaining a method of mixing the first image 10, a second image 40, and a third image 50, based on the weight data.

Referring to FIG. 7, the first image 10 includes a first sample 11, a second sample 12, a third sample 13, and a fourth sample 14, and respective values of the first sample 11, the second sample 12, the third sample 13, and the fourth sample 14 are 5, 6, 9, and 5, respectively. FIG. 7 illustrates inclusion of the four first, second, third, and fourth samples 11, 12, 13, and 14 in the first image 10, but this is merely to clearly explain one feature of the disclosure. The number of samples included in the first image 10 may vary.

The second sample 12 and the third sample 13 of the first image 10 are noise. Because the second sample 12 different from the value 5 of each of the first sample 11 and the fourth sample 14 by 1 is weak noise, the third sample 13 different from the value 5 of each of the first sample 11 and the fourth sample 14 by 4 may be understood as strong noise.

The first weight data 20a, the second weight data 20b, and the third weight data 20c each including four samples are obtained as a result of processing of the first image 10 by the neural network 130.

According to an embodiment, a sum of the values of the samples included in the first weight data 20a, the second weight data 20b, and the third weight data 20c and positioned at the same location may be equal to a pre-determined value (for example, 10), because each of the first weight data 20a, the second weight data 20b, and the third weight data 20c represents a mixing ratio between the first image 10, the second image 40, and the third image 50.

Because the second sample 12 and the third sample 13 within the first image 10 are noise, it may be seen that the values of a second sample 22a and a third sample 23a of the first weight data 20a are less than those of a first sample 21a and a fourth sample 24a of the first weight data 20a. In other words, the mixing ratio of the first image 10 is increased for the first sample 11 and the fourth sample 14 not corresponding to noise within the first image 10, and the mixing ratio of the first image 10 is lowered for the second sample 12 and the third sample 13 corresponding to noise within the first image 10.

Because the second sample 12 within the first image 10 is weak noise and the third sample 13 within the first image 10 is strong noise, it may be seen that a second sample 22b within the second weight data 20b to be applied to the second image 40 created as a result of weak filtering has a relatively large value, and a third sample 23c within the third weight data 20c to be applied to the third image 50 created as a result of strong filtering has a relatively large value. In other words, the mixing ratio of the second image 40 is increased for the second sample 12 corresponding to weak noise within the first image 40, and the mixing ratio of the third image 50 is increased for the third sample 13 corresponding to strong noise within the first image 10.

According to an embodiment, the samples included in the first weight data 20a, the second weight data 20b, and the third weight data 20c may be regularized according to a pre-determined value. For example, the samples included in the first weight data 20a, the second weight data 20b, and the third weight data 20c may be regularized according to 1. As shown in FIG. 7, a sum of the samples of regularized first weight data 30a, regularized second weight data 30b, and regularized third weight data 30c at the same location obtained as a result of the regularization according to 1 is 1.

Next, referring to FIG. 8, the regularized first weight data 30a, the regularized second weight data 30b, and the regularized third weight data 30c are applied to the first image 10, the second image 40, and the third image 50, respectively. As shown in FIG. 8, the number of samples included in the second image 40 and the third image 50 may be equal to the number of samples included in the first image 10.

In some cases, instead of the regularized first weight data 30a, the regularized second weight data 30b, and the regularized third weight data 30c, the first weight data 20a, the second weight data 20b, and the third weight data 20c may be applied to the first image 10, the second image 40, and the third image 50, respectively.

A weight-applied first image 60 is obtained through a multiplication between the samples 11, 12, 13, and 14 of the first image 10 and samples 31a, 32a, 33a, and 34a of the regularized first weight data 30a, and a weight-applied second image 70 is obtained through a multiplication between samples 41, 42, 43, and 44 of the second image 40 and samples 31b, 32b, 33b, and 34b of the regularized second weight data 30b. A weight-applied third image 80 is obtained through a multiplication between samples 51, 52, 53, and 54 of the third image 50 and samples 31c, 32c, 33c, and 34c of the regularized third weight data 30c.

To apply the regularized first weight data 30a, the regularized second weight data 30b, and the regularized third weight data 30c to the first image 10, the second image 40, and the third image 50, respectively, a multiplication between the samples at the same location may be performed. As shown in FIG. 8, a first sample 61 of the weight-applied first image 60 may have a value of 4.0 through a multiplication between the first sample 11 of the first image 10 and the first sample 31a of the regularized first weight data 30a, and a second sample 62 of the weight-applied first image 60 may have a value of 2.4 through a multiplication between the second sample 12 of the first image 10 and the second sample 32a of the regularized first weight data 30a.

The output image 90 is obtained through summation of the weight-applied first image 60, the weight-applied second image 70, and the weight-applied third image 80. In this case, a summation may be applied to the samples at the same location. In other words, a first sample 91 within the output image 90 may have a value of 4.8 through summation of a first sample 61 within the weight-applied first image 60, a first sample 71 within the weight-applied second image 70, and a first sample 81 within the weight-applied third image 80. A second sample 92 of the output image 90 may have a value of 5.4 through summation of a second sample 62 of the weight-applied first image 60, a second sample 72 within the weight-applied second image 70, and a second sample 82 within the weight-applied third image 80.

The first sample 91, the second sample 92, the third sample 93, and the fourth sample 94 of the output image 90 have values of 4.8, 5.4, 6.5, and 5, respectively, and, when they are compared with the values of the first sample 11, the second sample 12, the third sample 13, and the fourth sample 14 of the first image 10, namely, 5, 6, 9, and 5, it may be seen that the second sample 92 and the third sample 93 corresponding to noise within the first image 10 become similar to the first sample 91 and the fourth sample 94.

Figure 9:
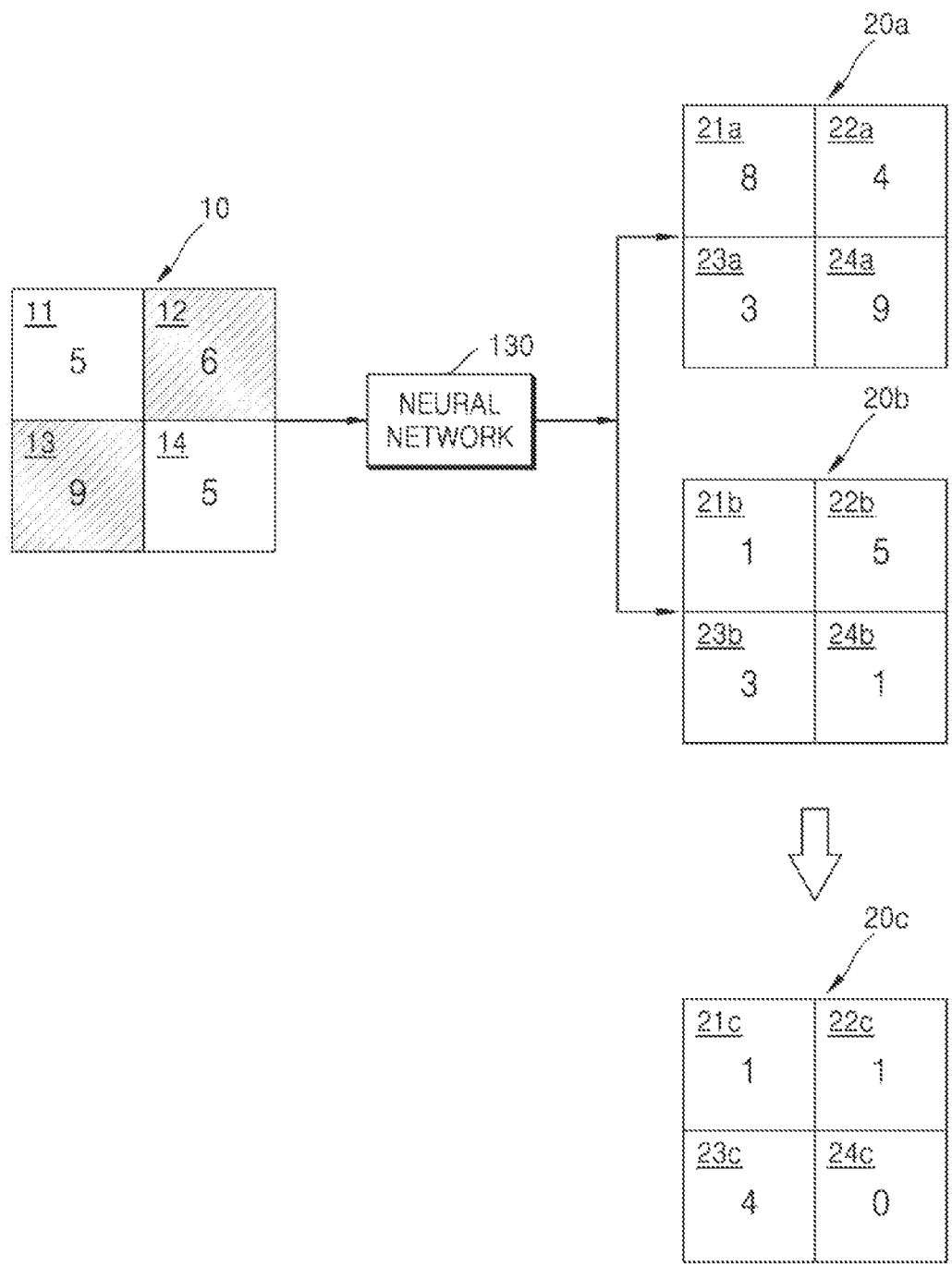
FIG. 9 is a diagram for explaining a method of deriving new weight data when the number of weight data output by the neural network is less than the number of images to be mixed.
Figure 10:
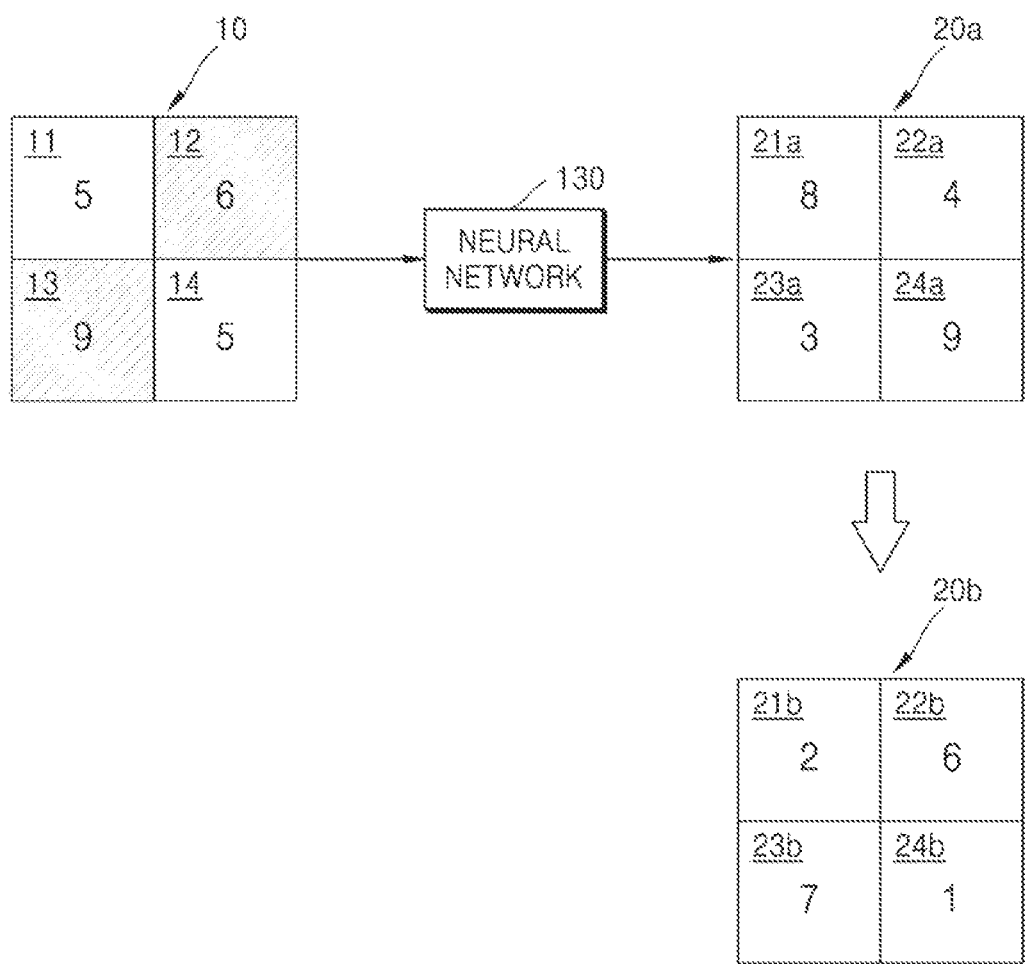
FIG. 10 is a diagram for explaining a method of deriving new weight data when the number of weight data output by the neural network is less than the number of images to be mixed.

FIGS. 9 and 10 are diagrams for explaining a method of deriving new weight data when the number of weight data output by the neural network 130 is less than the number of images to be mixed.

When the images to be mixed include the first image 10, the second image 40, and the third image 50, the first weight data 20a to be applied to the first image 10, the second weight data 20b to be applied to the second image 40, and the third weight data 20c to be applied to the third image 50 are needed, as described above. At this time, when one weight data or two weight data is output by the neural network 130, the mixing unit 230 may determine the new weight data from the one weight data or the two weight data.

As shown in FIG. 9, the first weight data 20a and the second weight data 20b may be output by the neural network 130. The mixing unit 230 may derive the sample values of the third weight data 20c from a difference value between a sum between the sample values of the first weight data 20a and the sample values of the second weight data 20b and a pre-determined value.

A sum of the value of the first sample 21a of the first weight data 20a of FIG. 9 and the value of the first sample 21b of the second weight data 20b of FIG. 9 is 9. When the pre-determined value is 10, a value obtained by subtracting 9 from 10, namely, 1, may be allocated to the first sample 21c of the third weight data 20c. Because a sum of the value of the second sample 22a of the first weight data 20a and the value of the second sample 22b of the second weight data 20b is 9, the value obtained by subtracting 9 from 10, namely, 1, may be allocated to the second sample 22c of the third weight data 22c.

In FIG. 9, the first weight data 20a and the second weight data 20b are output by the neural network 130 and the third weight data 20c is derived using the first weight data 20a and the second weight data 20b. However, in some cases, the mixing unit 230 may derive the sample values of the first weight data 20a, the second weight data 20b, and the third weight data 20c by applying a pre-determined computation formula to the sample values of data output by the neural network 130.

According to an embodiment, the mixing unit 230 may derive the first weight data 20a corresponding to a first computation formula, the second weight data 20b corresponding to a second computation formula, and the third weight data 20c corresponding to a third computation formula by applying the first computation formula, the second computation formula, and the third computation formula to the samples of the data output by the neural network 130. The first computation formula, the second computation formula, and the third computation formula may include at least one of a multiplication operation and an addition operation, and the first computation formula, the second computation formula, and the third computation formula may be different from one another. For example, the first computation formula may indicate that a first predetermined value needs to be added to the sample values of the data output by the neural network 130, and the second computation formula may indicate that a second predetermined value needs to be subtracted from the sample values of the data output by the neural network 130. The third computation formula may indicate that a third predetermined value needs to be subtracted from the sample values of the data output by the neural network 130.

Next, referring to FIG. 10, when the images to be mixed include the first image 10 and the second image 40, the first weight data 20a to be applied to the first image 10 and the second weight data 20b to be applied to the second image 40 are needed. At this time, when one weight data is output by the neural network 130, the mixing unit 230 may derive the new weight data from the one weight data.

The mixing unit 230 may derive the values of the samples 21b, 22b, 23b, and 24b of the second weight data 20b from a difference between a pre-determined value and the samples 21a, 22a, 23a, and 24a of the first weight data 20a.

When the pre-determined value is 10, a value obtained by subtracting 8, which is the value of the first sample 21a of the first weight data 20a, from 10, namely, 2, may be applied to the first sample 21b of the second weight data 20b. A value obtained by subtracting 4, which is the value of the second sample 22a of the first weight data 20a, from 10, namely, 6, may be applied to the second sample 22b of the second weight data 20b.

The mixing unit 230 may obtain the output image 90 by applying the first weight data 20a output by the neural network 130 to the first image 10 and applying the second weight data 20b derived based on the first weight data 20a to the second image 40.

According to an embodiment, a user may control the sample value of at least one of the first weight data 20a, the second weight data 20b, and the third weight data 20c that are to be applied to the first image 10, the second image 40, and the third image 50 that are to be mixed. The user may control the sample value of at least one of the first weight data 20a, the second weight data 20b, and the third weight data 20c according to a result of determining which image among the first image 10, the second image 40, and the third image 50 will have an increased or decreased influence upon the samples of the output image 90.

As will be described later with reference to FIG. 15, the neural network 130 is trained in a direction of maximally suppressing the use of a filter, and thus the user may easily recognize what sample within the first image 10 corresponds to noise, from the weight data output by the neural network 130. When a sample value at a specific location within the second weight data 20b or the third weight data 20c is large or a sample value at a specific location within the first weight data 20a is small, the user may recognize that a corresponding sample within the first image 10 is noise. Thus, when a sample value within the first weight data 20a that is to be applied to a sample actually not corresponding to noise within the first image 10 is small, the user may increase the sample value within the first weight data 20a to increase an influence of the sample of the first image 10 upon the output image 90. On the other hand, when a sample value within the first weight data 20a that is to be applied to a sample actually corresponding to noise within the first image 10 is large, the user may decrease the sample value within the first weight data 20a to reduce the influence of the sample of the first image 10 upon the output image 90.

A changing process of a sample value within weight data will now be described with reference to FIGS. 11 and 12.

Figure 11:
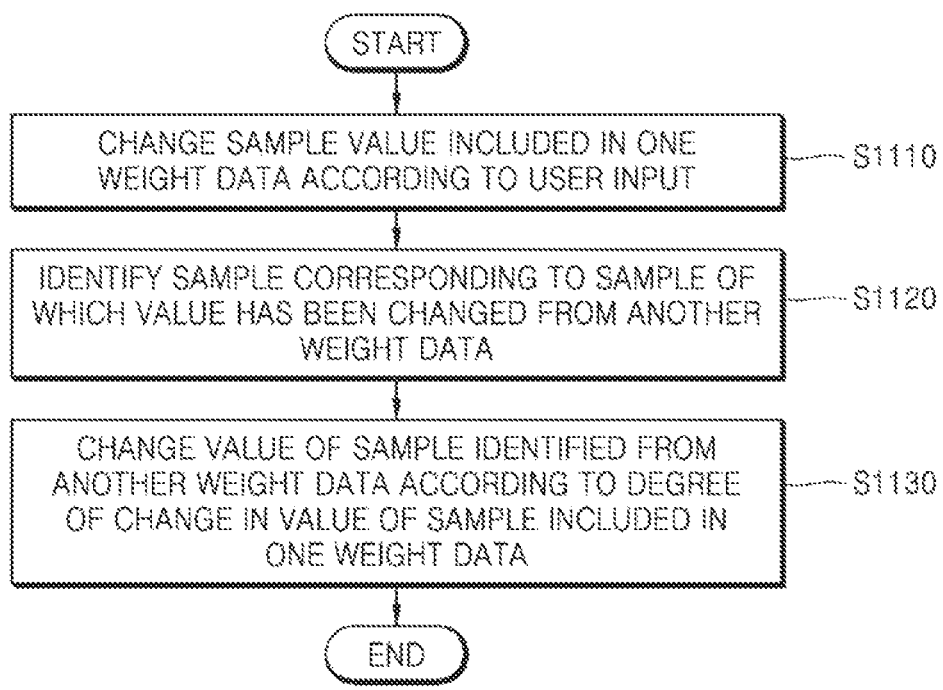
FIG. 11 is a flowchart of a method of changing a sample value within weight data, according to an embodiment of the disclosure.
Figure 12:
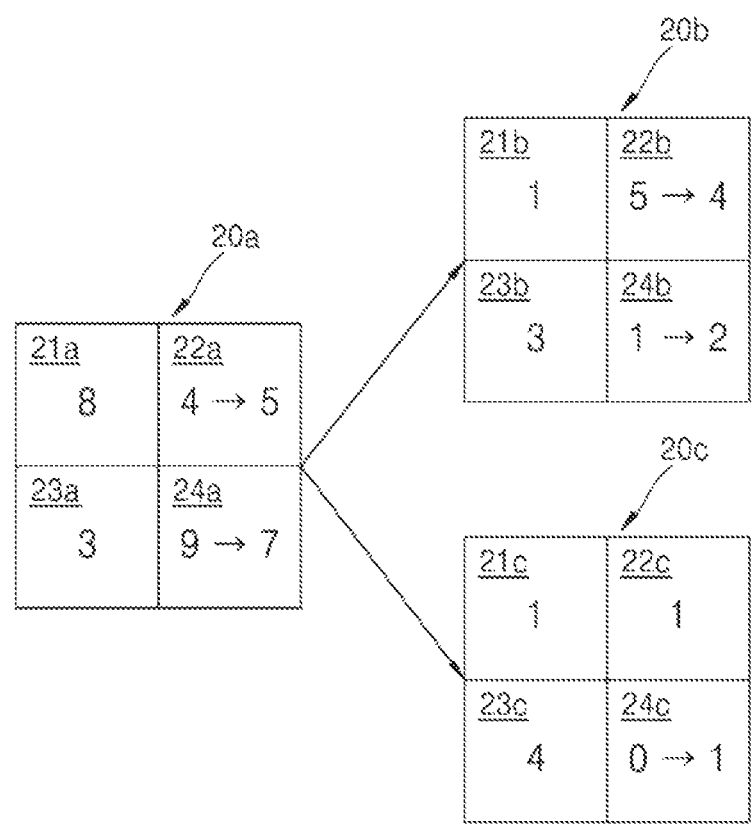
FIG. 12 is a diagram illustrating weight data of which sample values change according to user inputs.

FIG. 11 is a flowchart of a method of changing a sample value within weight data, according to an embodiment of the disclosure, and FIG. 12 is a diagram illustrating weight data of which sample values change according to user inputs.

In operation S1110, the mixing unit 230 changes the value of a sample value included in one weight data according to a user input. For example, the mixing unit 230 may increase or decrease a sample value at a specific location of the first weight data 20a according to a user input.

As shown in FIG. 12, the mixing unit 230 may change the value of the second sample 22a of the first weight data 20a from 4 to 5 and the value of the fourth sample 24a from 9 to 7, according to a user input.

The user may select samples that are to be changed from the first weight data 20a, and may increase or decrease the values of the selected samples.

In operation S1120, the mixing unit 230 identifies a sample corresponding to the sample changed according to a user input among the samples of the one weight data, from another weight data.

For example, in FIG. 12, when the values of the second sample 22a and the fourth sample 24a of the first weight data 20a have changed, the mixing unit 230 may identify corresponding samples within the second weight data 20b and the third weight data 20c, namely, the second sample 22b and the fourth sample 24b of the second weight data 20b and the second sample 22c and the fourth sample 24c of the third weight data 20c.

In operation S1130, the mixing unit 230 changes the value of the sample identified from the other weight data according to the degree of change in the value of the sample included in the one weight data.

According to an embodiment, the mixing unit 230 may decrease the value of the sample identified from the other weight data when the value of the sample included in the one weight data has been increased, and may increase the value of the sample identified from the other weight data when the value of the sample included in the one weight data has been decreased.

The mixing unit 230 may change the value of the sample included in the other weight data according to a changed in the value of the sample included in the one weight data so that a sum of the sample values at the same location included in the first weight data 20a, the second weight data 20b, and the third weight data 20c is equal to a pre-determined value.

Referring to FIG. 12, when the value of the second sample 22a of the first weight data 20a has increased from 4 to 5, the mixing unit 230 may decrease the value of the second sample 22b of the second weight data 20b from 5 to 4 so that a sum of the values of the second sample 22a of the first weight data 20a, the second sample 22b of the second weight data 20b, and the second sample 22c of the third weight data 20c is equal to a pre-determined value (for example, 10). In some cases, the mixing unit 230 may decrease the value of the second sample 22c of the third weight data 20c instead of the second sample 22b of the second weight data 20b from 1 to 0.

When the value of the fourth sample 24a of the first weight data 20a has decreased from 9 to 7, the mixing unit 230 may increase the value of the fourth sample 24b of the second weight data 20b from 1 to 2 and increase the value of the fourth sample 24c of the third weight data 20c from 0 to 1 so that a sum of the values of the fourth sample 24a of the first weight data 20a, the fourth sample 24b of the second weight data 20b, and the fourth sample 24c of the third weight data 20c is equal to the pre-determined value (for example, 10).

FIG. 12 illustrates an embodiment in which the sample value of the first weight data 20a is changed according to a user input and the sample values of the second weight data 20b and the third weight data 20c are changed according to the change in the sample value of the first weight data 20a, but this is merely an example. In other words, according to an embodiment, the sample value of the second weight data 20b may be changed according to a user input, and the sample values of the first weight data 20a and the third weight data 20c may be changed according to the change in the sample value of the second weight data 20b.

In order to change the sample value of weight data, a user may select a region of which a sample value is to be changed from at least one of the first image 10 and the output image 90. This will now be described with reference to FIGS. 13 and 14.

Figure 13:
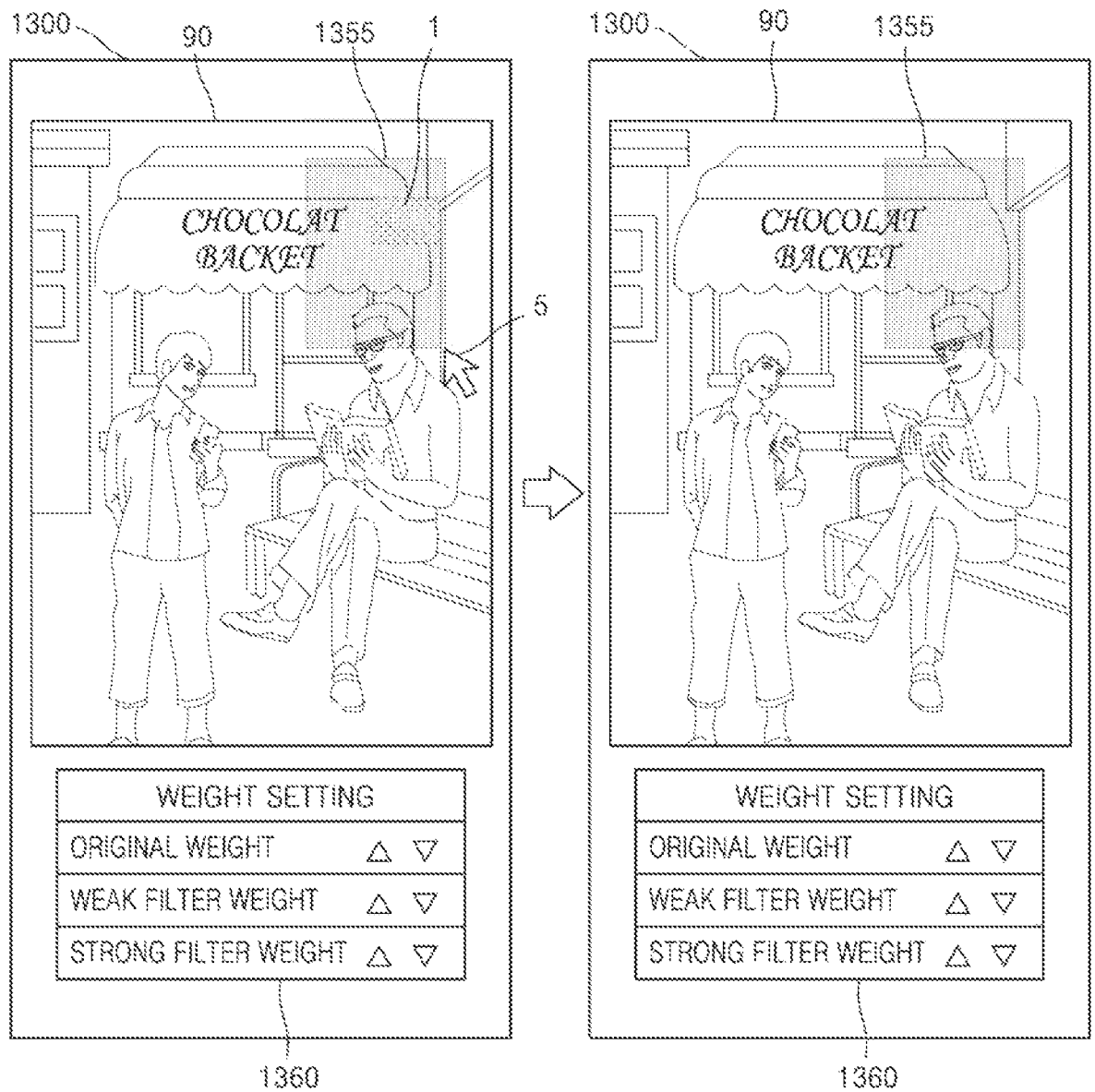
FIG. 13 is a user interface for changing a sample value within weight data.
Figure 14:
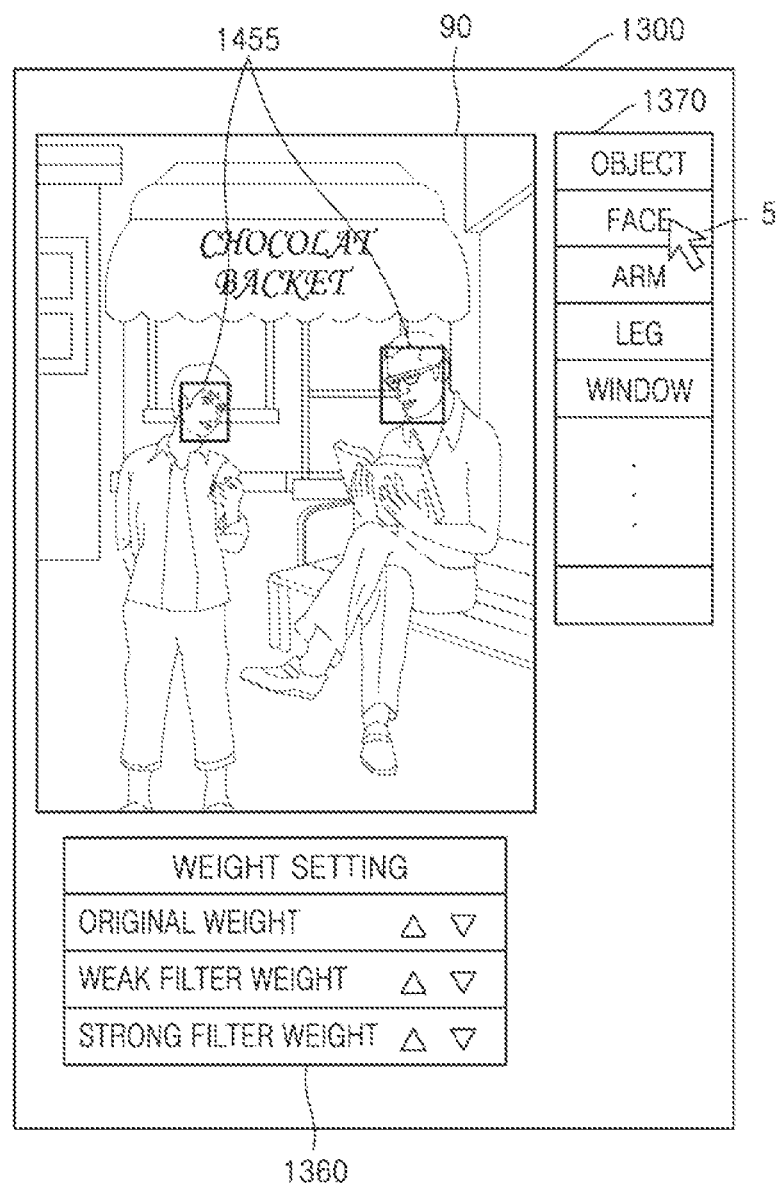
FIG. 14 is a user interface for changing a sample value within weight data.

FIGS. 13 and 14 are user interfaces for changing a sample value within weight data.

A user may control a mixing ratio between a first image 10 and an image (i.e., a second image 40 or a third image 50) corresponding to a result of filtering the first image 10 through at least one of the first image 10 and an output image 90 displayed on a display 1300.

As shown on the left side of FIG. 13, the user may select a region 1355 including noise 1 from the output image 90 through a pointer 5. The user may increase or decrease an original weight, a weak filter weight, and a strong filter weight on a weight setting menu 1360.

The original weight may correspond to the first weight data 20a to be applied to the first image 10, the weak filter weight may correspond to the second weight data 20b to be applied to the second image 40, and the strong filter weight may correspond to the third weight data 20c to be applied to the third image 50.

The user may increase or decrease the original weight so that the sample values of the first weight data 20a corresponding to the first image 10 increase or decrease. The mixing unit 230 may identify a region corresponding to the region 1355 selected by the user from the output image 90 from the first weight data 20a, and may change the sample values included in the identified region.

The user may increase or decrease the weak filter weight so that the sample values of the second weight data 20b corresponding to the second image 40 increase or decrease. The mixing unit 230 may identify a region corresponding to the region 1355 selected by the user from the output image 90 from the second weight data 20b, and may change the sample values included in the identified region.

The user may increase or decrease the strong filter weight so that the sample values of the third weight data 20c corresponding to the third image 50 increase or decrease. The mixing unit 230 may identify a region corresponding to the region 1355 selected by the user from the output image 90 from the third weight data 20c, and may change the sample values included in the identified region.

As described above, when the sample value of at least one weight data among the first weight data 20a, the second weight data 20b, and the third weight data 20c is changed according to an input from the user, the mixing unit 230 may change the sample value of another weight data according to the degree of change in the sample value of the at least one weight data.

When weight setting by the user is completed, the mixing unit 230 may mix the first image 10, the second image 40, and the third image 50 according to the changed first weight data, the changed second weight data, and the changed third weight data to obtain a new output image 90.

As shown on the right side of FIG. 13, it can be seen that the noise 1 included in the previous output image 90 has been removed from the new output image 90.

FIG. 13 illustrates an embodiment in which the user performs weight setting by referring to the output image 90 displayed on the display 1300. However, the user may change the sample value of the weight data to be applied to at least one of the first image 10, the second image 40, and the third image 50, by referring to at least one of the first image 10, the output image 90, a map (for example, an edge map or a flat map) representing the characteristics of the first image 10, and a map (for example, an edge map or a flat map) representing the characteristics of the output image 90.

According to an embodiment, the image processing apparatus 200 may apply an object recognition algorithm to at least one of the first image 10 and the output image 90 in order to identify a region selected by the user from at least one of the first image 10 and the output image 90. The object recognition algorithm, which is an algorithm for identifying the type of object included in an image, is used in the image processing field, and thus a detailed description thereof will be omitted.

As shown in FIG. 14, the user may select an object to be changed in weight from an object selection menu 1370. For example, when a face object is selected through the pointer 5, the mixing unit 230 may identify a region 1455 corresponding to a face from the output image 90 displayed on the display 1300. When the user changes at least one of the original weight, the weak filter weight and the strong filter weight through the weight setting menu 1360, the mixing unit 230 may change the sample values of a region corresponding to the region 1455 within at least one weight data among the first weight data 20a, the second weight data 20b, and the third weight data 20c.

Figure 15:
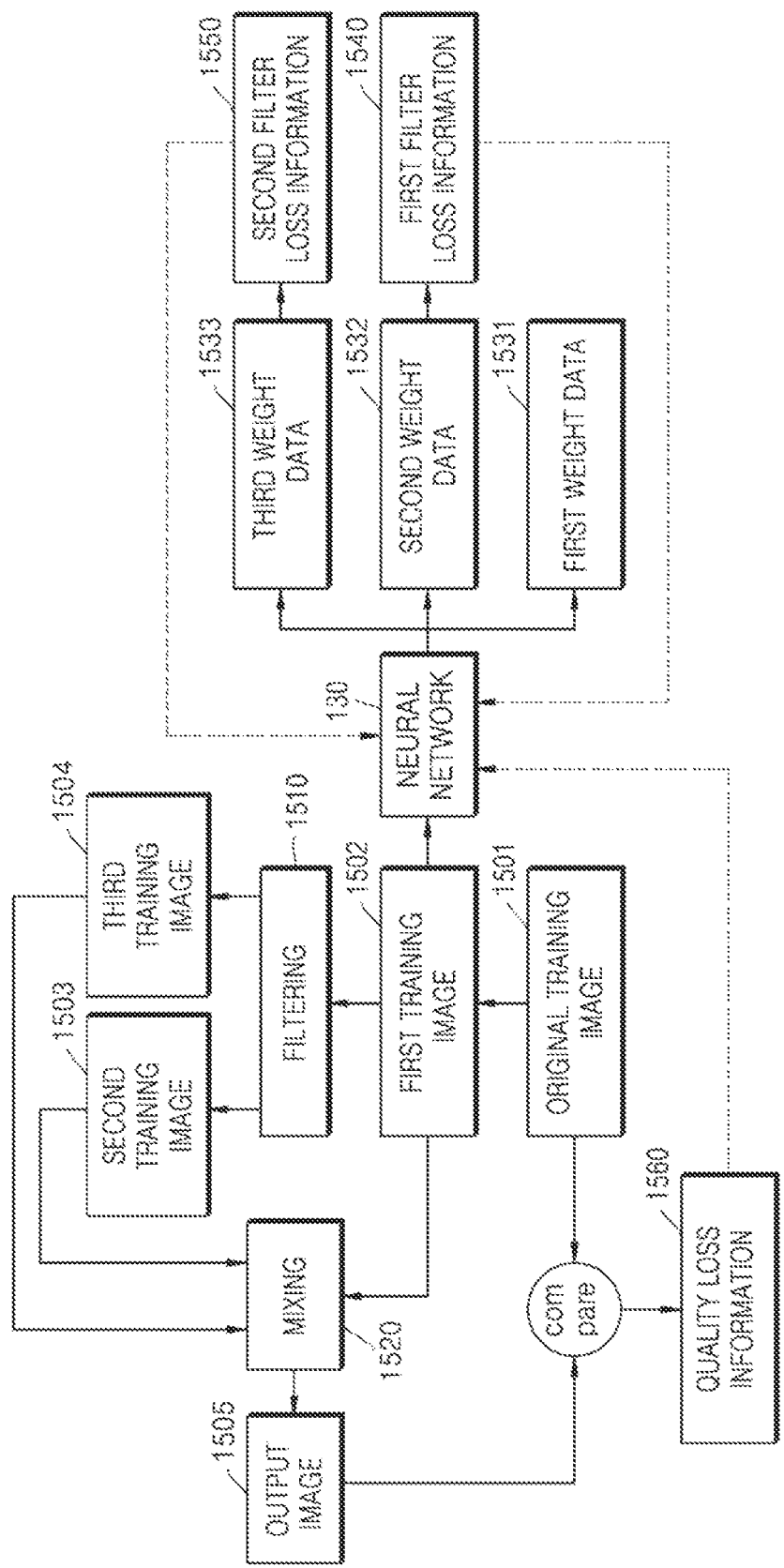
FIG. 15 is a diagram for explaining a method of training a neural network, according to an embodiment of the disclosure.

FIG. 15 is a diagram for explaining a method of training the neural network 130, according to an embodiment of the disclosure.

The neural network 130 needs to be trained so that an output image 1505 that is the same as/similar to an original training image 1501 may be obtained. To this end, quality loss information 1560 corresponding to a result of comparing the original training image 1501 with the output image 1505 is used to train the neural network 130. As described above, the neural network 130 may also be trained in a direction to suppress the use of filters as much as possible. Through this training process, a user may more intuitively adjust the weights.

In FIG. 15, a first training image 1502 corresponds to the first image 10 from which noise is to be removed, and a second training image 1503 and a third training image 1504 correspond to the second image 40 and the third image 50 obtained by removing noise from the first image 10, respectively. First weight data 1531, second weight data 1532, and third weight data 1533 respectively correspond to the first weight data 20a, the second weight data 20b, and the third weight data 20c obtained by applying the first image 10 to the neural network 130.

Describing a process of training the neural network 130 in detail, filtering 1510 is applied to the first training image 1502 corresponding to the original training image 1501.

The first training image 1502 may be obtained by encoding and decoding the original training image 1501. Due to the application of encoding/decoding to the original training image 1501, the first training image 1502 may include noise. In some cases, the first training image 1502 may include noise that may be generated during a transmission process through a network. In other words, the first training image 1502 may be an image including noise, which is not included in the original training image 1501.

The second training image 1503 and the third training image 1504 are obtained through the filtering 1510 with respect to the first training image 1502. When only the second image 40 is previously obtained through filtering with respect to the first image 10, only the second training image 1503 may be obtained through the filtering 1510 with respect to the first training image 1502 even during the process of training the neural network 130.

Separately from the application of the filtering 1510 to the first training image 1502, the first training image 1502 is input to the neural network 130 operating according to a pre-determined parameter. The neural network 130 processes the first training image 1502 according to the pre-determined parameter to output the first weight data 1531, the second weight data 1532, and the third weight data 1533. When only the second image 40 is previously obtained through filtering with respect to the first image 10, only the first weight data 1531 and the second weight data 1532 may be obtained as a result of processing the first training image 1502, even during the process of training the neural network 130.

According to an embodiment, when the number of weight data output by the neural network 130 is less than the number of images to be mixed, new weight data may be derived from the weight data output by the neural network 130.

The first training image 1502, the second training image 1503, and the third training image 1504 are mixed (1520) according to a mixing ratio indicated by the first weight data 1531, the second weight data 1532, and the third weight data 1533. The output image 1505 is obtained as a result of the mixing 1520 of the first training image 1502, the second training image 1503, and the third training image 1504.

The neural network 130 is trained according to final loss information obtained as a result of combining the quality loss information 1560, first filter loss information 1540, and second filter loss information 1550.

The quality loss information 1560 corresponds to a difference between the original training image 1501 and the output image 1505. The difference between the original training image 1501 and the output image 1505 may include at least one of a L1-norm value, an L2-norm value, a Structural Similarity (SSIM) value, a Peak Signal-To-Noise Ratio-Human Vision System (PSNR-HVS) value, a Multi-scale SSIM (MS-SSIM) value, a Variance Inflation Factor (VIF) value, and a Video Multimethod Assessment Fusion (VMAF) value between the original training image 1501 and the output image 1505.

The first filter loss information 1540 corresponds to a sum of the sample values included in the second weight data 1532, and the second filter loss information 1550 corresponds to a sum of the sample values included in the third weight data 1533.

The first filter loss information 1540 and the second filter loss information 1550 allow the sample values of the second weight data 1532 and the third weight data 1533 output by the neural network 130 to decrease. As the sample values of the second weight data 1532 and the third weight data 1533 increase, influences of the second training image 1503 and the third training image 1504 upon the output image 1505 increase. In other words, the neural network 130 is trained in a direction for minimizing influences of images subjected to the filtering 1510 upon the output image 1505.

When the first filter loss information 1540 and the second filter loss information 1550 are not used to train the neural network 130, it is difficult to easily recognize a location of noise on the first training image 1502 from the samples values of the first weight data 1531, the second weight data 1532, and the third weight data 1533. For example, when the first filter loss information 1540 and the second filter loss information 1550 are not used to train the neural network 130, even though a sample at a specific location on the first training image 1502 is not noise, a sample value at a specific location on the first weight data 1531 may be small and a sample value at a specific location on the second weight data 1532 may be large. This is because, because the neural network 130 has been trained only in a direction for decreasing the difference between the output image 1505 and the original training image 1501, values that the samples of the first weight data 1531 may have and values that the samples of the second weight data 1532 may have are not limited.

Thus, according to an embodiment, by using the first filter loss information 1540 and the second filter loss information 1550, the neural network 130 is trained so that, when a sample at a specific location on the first training image 1502 is not noise, a sample value at a specific location on the first weight data 1531 increases and a sample value at a specific location on the second weight data 1532 decreases.

The quality loss information 1560, the first filter loss information 1540, and the second filter loss information 1550 may be combined according to Equation 1 below to obtain the final loss information.

$$\text{Final loss information} = a*\text{quality loss information} + b*\text{first filter loss information} + c*\text{second filter loss information} \quad \text{Equation 1}$$

In Equation 1, a, b, and c are weights that are applied to the quality loss information 1560, the first filter loss information 1540, and the second filter loss information 1550, respectively.

According to an embodiment, when the filtering strength of a filtering algorithm used to obtain the third training image 1504 is greater than that of a filtering algorithm used to obtain the second training image 1503, c may be greater than b. Thus, use of a strong filtering algorithm is more suppressed than use of a weak filtering algorithm. In other words, an influence of the third training image 1504 upon the output image 1505 is more reduced than an influence of the second training image 1503 upon the output image 1505. Accordingly, when a sample value at a specific location within the third weight data 1533 is large, the user may recognize that a sample at a specific location within the first image 10 is strong noise.

Figure 16:
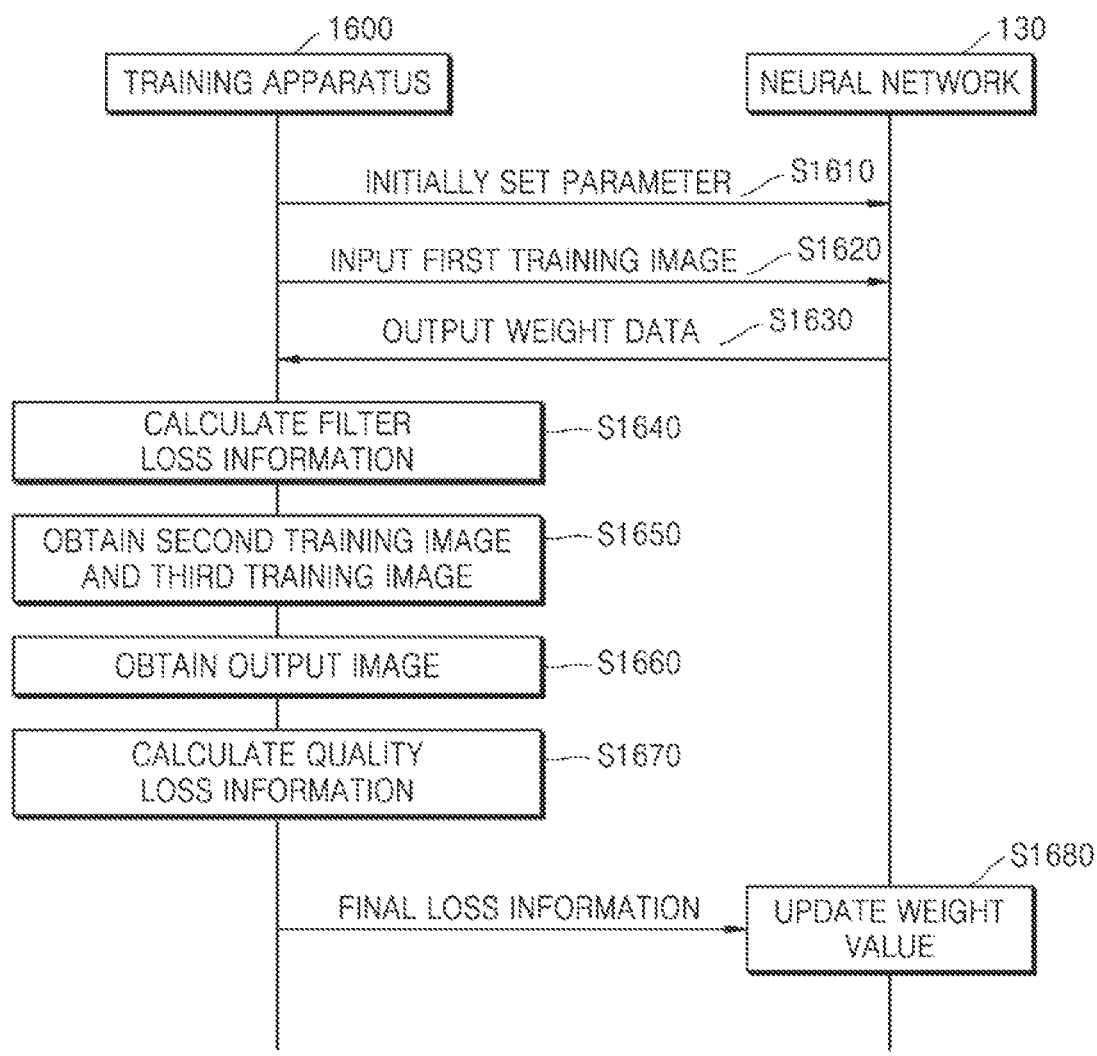
FIG. 16 is a flowchart of a method, performed by a training apparatus, of training a neural network, according to an embodiment of the disclosure.

FIG. 16 is a flowchart of a method, performed by a training apparatus 1600, of training the neural network 130, according to an embodiment of the disclosure.

The training of the neural network 130 described above with reference to FIG. 15 may be performed by the training apparatus 1600. The training apparatus 1600 may be, for example, the image processing apparatus 200 or a separate server. A parameter of the neural network 130 obtained as a result of training is stored in the image processing apparatus 200.

Referring to FIG. 16, the training apparatus 1600 may initially set the parameter of the neural network 130 (S1610). Thus, the neural network 130 may operate according to the initially set parameter.

The training apparatus 1600 inputs the first training image 1502 to the neural network 130 (S1620), and the neural network 130 outputs weight data (S1630). As described above, the number of weight data output by the neural network 130 may be equal to the number of images that are to be mixed. When the first training image 1502, the second training image 1503, and the third training image 1504 are images to be mixed, the neural network 130 may output the first weight data 1531, the second weight data 1532, and the third weight data 1533.

The training apparatus 1600 calculates the filter loss information from sample values of the weight data to be applied to an image obtained as a result of the filtering 1510 with respect to the first training image 1502 (S1640).

The training apparatus 1600 obtains the second training image 1503 and the third training image 1504 from which noise has been removed by applying a filtering algorithm to the first training image 1502 (S1650).

The training apparatus 1600 obtains the output image 1505 by performing the mixing 1520 on the first training image 1502, the second training image 1503, and the third training image 1504 according to the weight data (S1660), and calculates the quality loss information 1560 between the output image 1505 and the original training image 1501 (S1670).

The training apparatus 1600 calculates the final loss information by combining the filter loss information with the quality loss information 1560, and the neural network 130 updates the initially set parameter through a back propagation process based on the final loss information (S1680).

Thereafter, the training apparatus 1600 and the neural network 130 update the parameter while repeating operations S1620 through S1680 until the parameter is minimized. During each repetition process, the neural network 130 operates according to the parameter updated during a previous process.

Figure 17:
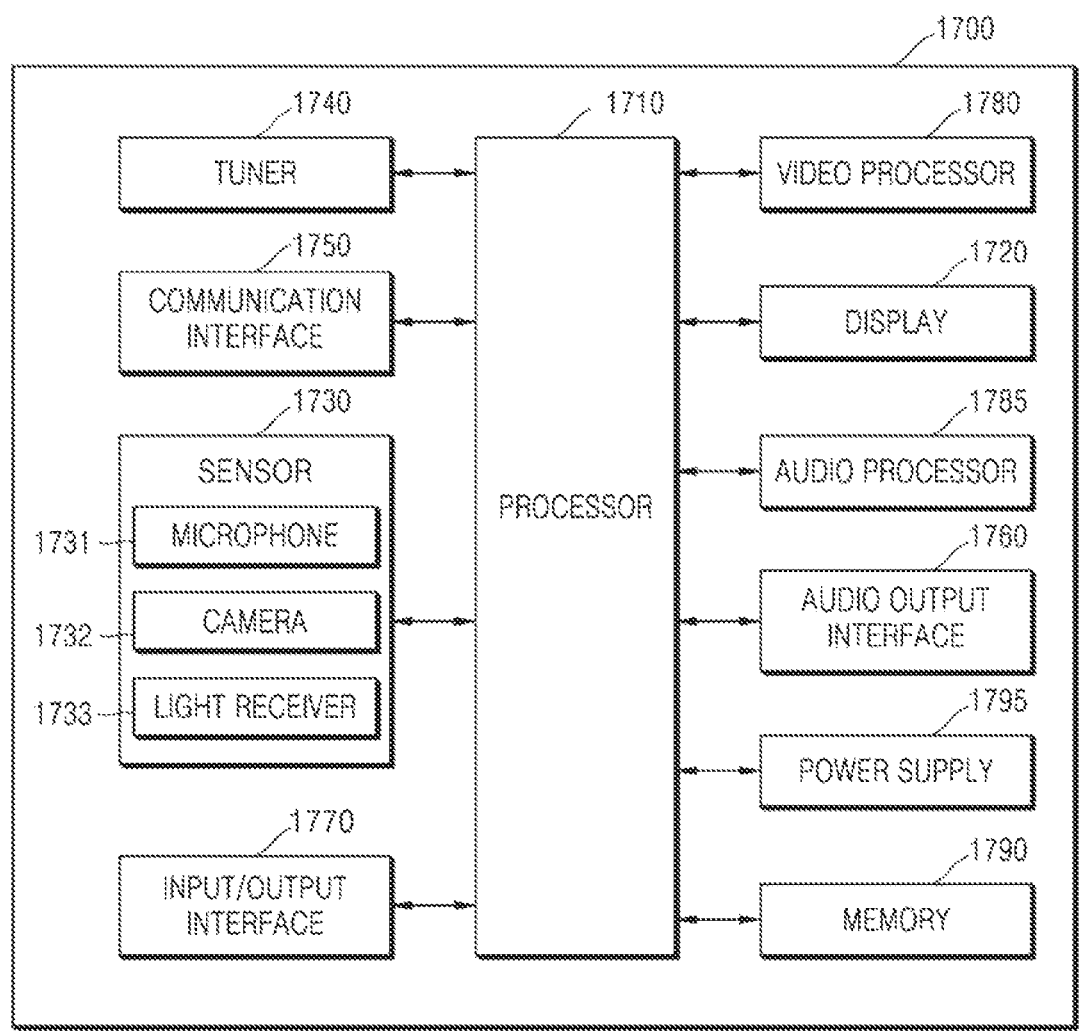
FIG. 17 is a block diagram of a structure of an image display apparatus including an image processing apparatus, according to an embodiment of the disclosure.

FIG. 17 is a block diagram of a structure of an image display apparatus 1700 including the image processing apparatus 200, according to an embodiment of the disclosure.

The image display apparatus 1700 of FIG. 17 may include the image processing apparatus 200 of FIG. 2.

Referring to FIG. 17, the image display apparatus 1700 may include a tuner 1740, a processor 1710, a display 1720, a communication interface 1750, a sensor 1730, an input/output (I/O) interface 1770, a video processor 1780, an audio processor 1785, an audio output interface 1760, a memory 1790, and a power supply 1795.

The tuner 1740 according to an embodiment may tune and select only a frequency of a channel desired to be received from among many radio wave components via amplification, mixing, resonance, or the like of a wired or wireless broadcasting signal. The broadcasting signal includes audio, video, and additional information (for example, an electronic program guide (EPG)).

The tuner 1740 may receive a broadcasting signal from various sources, such as terrestrial broadcasting, cable broadcasting, satellite broadcasting, and Internet broadcasting. The tuner 1740 may also receive a broadcasting signal from a source such as analog broadcasting or digital broadcasting.

The sensor 1730 senses a voice of a user, an image of the user, or an interaction with the user, and may include a microphone 1731, a camera 1732, and a light receiver 1733.

The microphone 1731 receives an uttered voice of the user. The microphone 1731 may transform the received voice into an electrical signal and output the electrical signal to the processor 1710. The user voice may include, for example, a voice corresponding to a menu or function of the image display apparatus 1700.

The camera 1732 may receive an image (for example, consecutive frames).

The light receiver 1733 receives an optical signal (including a control signal) from an external control device via a light window or the like of the bezel of the display 1720. The light receiver 1733 may receive an optical signal corresponding to a user input (for example, touch, pressing, a touch gesture, a voice, or a motion) from the control device. A control signal may be extracted from the received optical signal under the control by the processor 1710.

The I/O interface 1770 receives video (for example, a moving picture), audio (for example, a voice or music), and additional information (for example, an EPG) from outside the image display apparatus 1700 under the control of the processor 1710. The I/O interface 1770 may include one of a High-Definition Multimedia Interface (HDMI), a Mobile High-Definition Link (MHL), a Universal Serial Bus (USB), a Display Port (DP), a Thunderbolt, a Video Graphics Array (VGA) port, an RGB port, a D-subminiature (D-SUB), a Digital Visual Interface (DVI), a component jack, and a PC port.

The processor 1710 controls an overall operation of the image display apparatus 1700 and signal transfer among the internal components of the image display apparatus 1700 and processes data. When there is an input of a user or stored preset conditions are satisfied, the processor 1710 may execute an operating system (OS) and various applications that are stored in the memory 1790.

The processor 1710 may include a random-access memory (RAM) that stores a signal or data input by an external source of the image display apparatus 1700 or is used as a memory area corresponding to various operations performed by the image display apparatus 1700 (e.g., removal of noise from an image), a read-only memory (ROM) that stores a control program for controlling the image display apparatus 1700, and a processor.

The video processor 1780 processes video data that is received by the image display apparatus 1700. The video processor 1780 may perform a variety of image processing, such as decoding, scaling, noise filtering, frame rate transformation, and resolution transformation, on the received video data.

The audio processor 1785 processes audio data. The audio processor 1785 may perform a variety of processing, such as decoding, amplification, or noise filtering, on the audio data. The audio processor 1785 may include a plurality of audio processing modules to process audios corresponding to a plurality of content.

The audio output interface 1760 outputs audio included in a broadcasting signal received via the tuner 1740, under a control by the processor 1710. The audio output interface 1760 may output audio (for example, a voice or a sound) that is input via the communication interface 1750 or the I/O interface 1770. The audio output interface 1760 may also output audio stored in the memory 1790 under a control by the processor 1710. The audio output interface 1760 may include at least one of a speaker, a headphone output port, or a Sony/Philips Digital Interface (S/PDIF) output port.

The power supply 1795 supplies power that is input from an external power source, to the internal components of the image display apparatus 1700, under the control of the processor 1710. The power supply 1795 may also supply power that is output by one or more batteries located in the image display apparatus 1700, to the internal components of the image display apparatus 1700, under the control of the processor 1710.

The memory 1790 may store various data, programs, or applications for driving and controlling the image display apparatus 1700 under the control of the processor 1710. The memory 1790 may include a broadcasting receiving module, a channel control module, a volume control module, a communication control module, a voice recognition module, a motion recognition module, a light receiving module, a display control module, an audio control module, an external input control module, a power control module, a power control module of a wirelessly (for example, Bluetooth) connected external apparatus, a voice database (DB), or a motion DB. These modules and the DBs of the memory 1790 may be implemented as software in order to perform a broadcasting reception control function of the image display apparatus 1700, a channel control function, a volume control function thereof, a communication control function thereof, a voice recognition function thereof, a motion recognition function thereof, a light receiving control function thereof, a display control function thereof, an audio control function thereof, an external input control function thereof, a power control function thereof, or a power control function of the wirelessly (for example, Bluetooth) connected external apparatus. The processor 1710 may perform these functions by using the software stored in the memory 1790.

The block diagram of the image display apparatus 1700 shown in FIG. 17 is for an embodiment. Components illustrated in FIG. 17 may be combined or omitted according to the specification of the image display apparatus 1700 when being actually implemented, or additional components may be included in the block diagram of FIG. 17. In other words, two or more components may be combined into a single component, or a single component may be divided into two or more components. A function performed in each block is merely an example to explain embodiments, and a detailed operation or device of each block does not limit the scope of the embodiments.

The above-described embodiments of the disclosure can be written as computer-executable programs, and the written computer-executable programs can be stored in a machine-readable storage medium.

The machine-readable storage medium may be provided as a non-transitory storage medium. The 'non-transitory storage medium' is a tangible device and only means that it does not contain a signal (e.g., electromagnetic waves). This term does not distinguish a case in which data is stored semi-permanently in a storage medium from a case in which data is temporarily stored. For example, the non-transitory storage medium may include a buffer in which data is temporarily stored.

According to an embodiment of the disclosure, a method according to various disclosed embodiments may be provided by being included in a computer program product. Computer program products are commodities and thus may be traded between sellers and buyers. Computer program products are distributed in the form of device-readable storage media (e.g., compact disc read only memory (CD-ROM)), or may be distributed (e.g., downloaded or uploaded) through an application store or between two user devices (e.g., smartphones) directly and online. In the case of online distribution, at least a portion of the computer program product (e.g., a downloadable app) may be stored at least temporarily in a device-readable storage medium, such as a memory of a manufacturer's server, a server of an application store, or a relay server, or may be temporarily generated.

While one or more embodiments of the disclosure have been described with reference to the figures, it will be understood by those of ordinary skill in the art that various changes in form and details may be made therein without departing from the spirit and scope as defined by the following claims.

What is claimed is:

1. An image processing apparatus comprising:
a memory storing at least one instruction; and
a processor configured to execute the at least one instruction to:
obtain, from a first image, a second image from which noise has been removed using a first filtering algorithm,
determine first weight data corresponding to the first image and second weight data corresponding to the second image by applying the first image to a neural network for deriving a mixing ratio between the first image and the second image,
change a sample value included in at least one of the first weight data and the second weight data, according to an input from a user, and
obtain an output image by mixing a first result obtained by applying the first weight data to the first image with a second result obtained by applying the second weight data to the second image.

2. The image processing apparatus of claim 1, wherein the first filtering algorithm is based on a non-neural network.

3. The image processing apparatus of claim 1, wherein the processor is further configured to execute the at least one instruction to:
obtain the first weight data from the neural network, and
determine the second weight data, based on a difference between a pre-determined value and sample values of the first weight data.

4. The image processing apparatus of claim 1, wherein
first weight data for a first training image corresponding to an original training image, and second weight data for a second training image obtained by filtering the first training image, are obtained by applying the first training image to the neural network, and
the neural network is trained based on first loss information corresponding to a difference between an output image obtained by mixing the first training image with the second training image and the original training image, and second loss information corresponding to a sum of sample values of the second weight data for the second training image.

5. The image processing apparatus of claim 1, wherein the processor is further configured to execute the at least one instruction to:
obtain, from the first image, a third image from which noise has been removed using a second filtering algorithm, determine third weight data corresponding to the third image by applying the first image to the neural network, and obtain the output image by mixing the first result, the second result, and a third result obtained by applying the third weight data to the third image.

6. The image processing apparatus of claim 5, wherein a type of the first filtering algorithm used to obtain the second image is different from a type of the second filtering algorithm used to obtain the third image.

7. The image processing apparatus of claim 1, wherein first weight data for a first training image corresponding to an original training image, second weight data for a second training image obtained by filtering the first training image, and third weight data for a third training image obtained by filtering the first training image are obtained by applying the first training image to the neural network, and the neural network is trained based on final loss information obtained through a weighted sum of first loss information, second loss information, and third loss information, wherein the first loss information corresponds to a difference between an output image obtained by mixing the first training image, the second training image, and the third training image, and the original training image, wherein the second loss information corresponds to a sum of sample values of the second weight data for the second training image, and wherein the third loss information corresponds to a sum of sample values of the third weight data for the third training image.

8. The image processing apparatus of claim 7, wherein, to obtain the final loss information, a weight applied to the second loss information is less than a weight applied to the third loss information.

9. The image processing apparatus of claim 8, wherein a filtering strength of the first filtering algorithm used to obtain the second training image is smaller than a filtering strength of a second filtering algorithm used to obtain the third training image.

10. The image processing apparatus of claim 1, wherein the processor is further configured to execute the at least one instruction to:

change a first sample value included in one weight data among the first weight data and the second weight data, according to the input from the user, change a second sample value included in another weight data according to a degree of change in the first sample value included in the one weight data, and obtain the output image by mixing a result obtained by applying the first weight data including the changed sample value to the first image, with a result obtained by applying the another weight data including the changed sample value to the second image.

11. The image processing apparatus of claim 10, wherein the processor is further configured to execute the at least one instruction to:

decrease the second sample value included in the another weight data when the first sample value included in the one weight data is increased according to the input from the user, and increase the second sample value included in the another weight data when the first sample value included in the one weight data is decreased according to the input from the user.

12. The image processing apparatus of claim 10, wherein the processor is further configured to execute the at least one instruction to change the second sample value included in the another weight data as the first sample value included in the one weight data is changed, so that a sum of the first sample value and the second sample value is equal to a pre-determined value.

13. The image processing apparatus of claim 10, wherein the processor is further configured to execute the at least one instruction to:

identify a region selected by the user from the first image or the output image, and change sample values included in a region corresponding to the identified region among samples included in the one weight data.

14. The image processing apparatus of claim 13, wherein the processor is further configured to execute the at least one instruction to identify a region selected by the user, through object recognition with respect to the first image or the output image.

15. The image processing apparatus of claim 1, wherein the processor is further configured to execute the at least one instruction to obtain the output image through a summation between the first result obtained through multiplication between samples of the first image and samples of the first weight data, and the second result obtained through multiplication between samples of the second image and samples of the second weight data.

16. An image processing method comprising:

obtaining, from a first image, a second image from which noise has been removed using a first filtering algorithm;

determining first weight data corresponding to the first image and second weight data corresponding to the second image, by applying the first image to a neural network for outputting a mixing ratio between the first image and the second image;

changing a sample value included in at least one of the first weight data and the second weight data, according to an input from a user; and obtaining an output image by mixing a first result obtained by applying the first weight data to the first image, with a second result obtained by applying the second weight data to the second image.

17. The image processing method of claim 16, further comprising:

obtaining first weight data for a first training image corresponding to an original training image, and second weight data for a second training image obtained by filtering the first training image, by applying the first training image to the neural network; and training the neural network based on first loss information corresponding to a difference between an output image obtained by mixing the first training image with the second training image and the original training image, and second loss information corresponding to a sum of sample values of the second weight data for the second training image.

18. The image processing method of claim 16, further comprising:

obtaining, from the first image, a third image from which noise has been removed using a second filtering algorithm;

determining third weight data corresponding to the third image by applying the first image to the neural network for deriving a mixing ratio between the first image, the second image, and the third image; and obtaining the output image by mixing the first result, the second result, and a third result obtained by applying the third weight data to the third image.

19. A non-transitory computer-readable recording medium having recorded thereon a computer program, which, when executed by a computer, performs an image processing method comprising:
   obtaining, from a first image, a second image from which noise has been removed using a first filtering algorithm;
   determining first weight data corresponding to the first image and second weight data corresponding to the second image, by applying the first image to a neural network for outputting a mixing ratio between the first image and the second image;
   changing a sample value included in at least one of the first weight data and the second weight data, according to an input from a user; and
   obtaining an output image by mixing a first result obtained by applying the first weight data to the first image, with a second result obtained by applying the second weight data to the second image.

20. The non-transitory computer-readable recording medium of claim 19, wherein the image processing method further comprises:
   obtaining first weight data for a first training image corresponding to an original training image, and second weight data for a second training image obtained by filtering the first training image, by applying the first training image to the neural network; and
   training the neural network based on first loss information corresponding to a difference between an output image obtained by mixing the first training image with the second training image and the original training image, and second loss information corresponding to a sum of sample values of the second weight data for the second training image.

* * * * *